United States Patent
Yao et al.

(10) Patent No.: US 10,411,262 B2
(45) Date of Patent: Sep. 10, 2019

(54) AQUEOUS ENERGY STORAGE DEVICES WITH ORGANIC ELECTRODE MATERIALS

(71) Applicant: University of Houston System, Houston, TX (US)

(72) Inventors: Yan Yao, Pearland, TX (US); Yanliang Liang, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 671 days.

(21) Appl. No.: 14/249,671

(22) Filed: Apr. 10, 2014

(65) Prior Publication Data

US 2014/0308581 A1 Oct. 16, 2014

Related U.S. Application Data

(60) Provisional application No. 61/810,599, filed on Apr. 10, 2013.

(51) Int. Cl.
*H01M 4/60* (2006.01)
*H01M 10/36* (2010.01)

(52) U.S. Cl.
CPC .......... *H01M 4/606* (2013.01); *H01M 4/608* (2013.01); *H01M 10/36* (2013.01); *H01M 2300/002* (2013.01); *Y10T 29/49108* (2015.01)

(58) Field of Classification Search
CPC .............................. H01M 4/606; H01M 4/608
See application file for complete search history.

(56) References Cited

U.S. PATENT DOCUMENTS

| 4,427,751 | A | * | 1/1984 | Furukawa | H01M 4/244 429/206 |
| 4,535,039 | A | | 8/1985 | Naarmann et al. | |
| 4,820,595 | A | * | 4/1989 | MacDiarmid | H01M 4/68 429/210 |
| H1721 | H | * | 4/1998 | Wainwright | H01M 4/24 429/49 |
| 6,248,474 | B1 | | 6/2001 | Nishiyama et al. | |
| 9,466,839 | B2 | | 10/2016 | Otsuka et al. | |
| 2003/0091905 | A1 | * | 5/2003 | Nobuta | H01G 9/038 429/347 |
| 2003/0118877 | A1 | | 6/2003 | Armand et al. | |
| 2010/0248078 | A1 | | 9/2010 | Beard | |

(Continued)

FOREIGN PATENT DOCUMENTS

JP S53032338 A 3/1978
JP S55161376 A 12/1980

(Continued)

OTHER PUBLICATIONS

Machine translation of JP3045750B2 printed Nov. 2016.*

(Continued)

*Primary Examiner* — Maria Laios
(74) *Attorney, Agent, or Firm* — Winstead PC

(57) ABSTRACT

An aqueous metal-ion battery and a method for constructing same. In one embodiment, the battery includes an aqueous electrolyte and at least one electrode comprising at least one organic electrode material. A method comprises incorporating an organic electrode material into the electrode of an aqueous metal-ion battery. The organic electrode material further comprises at least one material chosen from carbonyl compounds.

14 Claims, 28 Drawing Sheets

(56) References Cited

U.S. PATENT DOCUMENTS

| | | | | |
|---|---|---|---|---|
| 2013/0004836 A1* | 1/2013 | Otsuka | ............. | H01M 4/137 429/188 |
| 2013/0122367 A1* | 5/2013 | Otsuka | ............. | H01M 4/5835 429/213 |

FOREIGN PATENT DOCUMENTS

| | | | | |
|---|---|---|---|---|
| JP | H0656989 A | 3/1994 | | |
| JP | H10294107 A | 11/1998 | | |
| JP | 3045750 B2 * | 5/2000 | ............. | H01M 4/60 |
| JP | 2011146221 A | 7/2011 | | |
| JP | 2013048012 A | 3/2013 | | |
| KR | 20050038254 A | 4/2005 | | |
| KR | 20120070728 A | 7/2012 | | |
| WO | 2011/8068217 A1 | 6/2011 | | |
| WO | 2011/111401 A1 | 9/2011 | | |
| WO | WO2011/111401 A1 * | 9/2011 | ........ | H01M 10/0566 |
| WO | WO2012/063489 A1 * | 5/2012 | ............. | H01M 4/60 |

OTHER PUBLICATIONS

PCT/US2014/033652 International Search Report and Written Opinion dated Sep. 29, 2014 (13 p.).

Korean Office Action dated Jul. 6, 2016, for Korean Application No. 10-2015-7031865 (8 p.)

English Analysis of Korean Office Action dated Jul. 6, 2016, for Korean Application No. 10-2015-7031865 (8 p.).

Choi, Wonsung, et al., "Aqueous Electrochemistry of Poly(vinylanthraquinone) for Anode-Active Materials in High-Density and Rechargeable Polymer/Air Batteries," Journal of the American Chemical Society, Oct. 19, 2011, vol. 133, pp. 19839-19843 (5 p.).

Song, Zhiping, et al., "Polymides: Promising Energy-Storage Materials," Angewandte Chemie, 2010, vol. 122, pp. 8622-8626 (5 p.).

Song, Zhiping, et al., "Polymer-Graphene Nanocomposites as Ultrafast-Charge and Discharge Cathodes for Rechargeable Lithium Batteries," American Chemical Society, Nano Letters, Mar. 26, 2012, vol. 12, pp. 2205-2211 (7 p.).

Extended European Search Report dated Nov. 10, 2016, for European Application No. 14783178.8 (9 p.).

Krause, L.J., et al., "Electrochemistry of Thermally Cyclized Polyimide Films," Journal of the Electrochemical Society, Electrochemical Society, Inc., U.S., vol. 135, No. 5, May 1, 1988, pp. 1137-1142 (6 p.).

Japanese Office Action dated Dec. 1, 2016, for Japanese Application No. 2016-507659 (4 p.).

English Translation of Japanese Office Action dated Dec. 1, 2016, for Japanese Application No. 2016-507659 (4 p.).

Choi et al., J. Am. Chem. Soc. 2011, 133, 19839-19843.

* cited by examiner

PAQS

PNDIE

AQUEOUS ENERGY STORAGE DEVICES WITH ORGANIC ELECTRODE MATERIALS

CROSS-REFERENCE TO RELATED APPLICATIONS

This application claims priority to U.S. Provisional Patent Application No. 61/810,599 filed on Apr. 10, 2013 and titled "Aqueous Batteries with Organic Electrode Materials," the application in its entirety being incorporated herein by reference.

STATEMENT REGARDING FEDERALLY SPONSORED RESEARCH OR DEVELOPMENT

This invention was made in part with Government support under award titled "Aqueous lithium-ion batteries with high-energy novel organic anodes for safe and robust energy storage" by The U.S. Department of Energy (award number: DE-AR0000380). The Government has certain rights in this invention.

BACKGROUND

Field of the Disclosure

This disclosure relates to a secondary or rechargeable battery, specifically to a battery with an aqueous electrolyte and at least one organic material used for an electrode.

Background

Generally, aqueous metal-ion batteries (AMIBs) represent a potential improvement in battery technology for commercial and industrial applications, particularly in vehicular designs. Prototype aqueous batteries have previously demonstrated ~75 Wh/kg of energy density based on the weight of electrodes. However, this parameter remains below the effective specific energy densities required to meet various governmental and regulatory recommended metrics, as well as certain application-specific demands. Further, it has been demonstrated that some cathode materials employed in some non-aqueous lithium-ion batteries (LIBs) are generally stable in aqueous electrolytes. Exemplary lithium-based cathode materials such as layered $LiCoO_2$ and spinel $LiMn_2O_4$ have shown capacities approaching their theoretical values with good reversibility at high charge/discharge rates. However, the intercalation compound-based anodes have demonstrated unsatisfactory cyclability in AMIBs, including aqueous lithium ion batteries (ALIB), due to material dissolution into the bulk electrolyte and oxidation by $O_2$ at the discharged state. Currently, creating an anode material with satisfactory cyclability for operation in high energy density batteries represents a technological hurdle to commercial implementation of AMIBs as a whole.

SUMMARY

The disclosure includes an AMIB having at least one electrode comprising at least one organic electrode material, wherein the organic electrode material comprises an organic electroactive compound. Further disclosed is an AMIB comprising a first electrode comprising at least one organic electrode material, an aqueous electrolyte, and a second electrode capable of metal-ion (de)intercalation/(un-)coordination. The first electrode comprises at least one organic electrode material chosen from carbonyl compounds.

Also disclosed is a method of constructing an aqueous battery comprising preparing an electrode capable of metal-ion (de)intercalation/(un-)coordination, contacting the electrode capable of metal-ion (de)intercalation/(un-)coordination with an aqueous electrolyte, preparing an electrode comprising at least one organic electrode material, contacting the electrode comprising at least one organic electrode material with the aqueous electrolyte, and applying an electric current to the two electrodes. The electrode comprising at least one organic electrode material comprises one or a mixture of organic electrode materials bearing electroactive carbonyl groups.

BRIEF DESCRIPTION OF THE DRAWINGS

For a detailed description of the disclosed embodiments, reference will now be made to the accompanying drawings in which.

DETAILED DESCRIPTION

OVERVIEW: Generally, electrical energy storage devices include capacitors and batteries. While both have various applications, batteries are preferred in the computer and electric vehicle industries for their cyclability and energy/power density. Batteries and particularly secondary or rechargeable batteries are configured as one or more electrochemical cells capable of converting electrical energy into chemical energy during charging and converting chemical energy into electric energy during discharging. In operation of most conventional batteries, the cathode and anode undergo compositional changes during discharging that are restored during charging. The medium through which the electrodes are electrically coupled is the electrolyte. Currently, solutions of salts, bases, and acids in aqueous/non-aqueous solvents are used as electrolytes in secondary batteries.

The present disclosure relates to configurations of aqueous electrolyte batteries. Aqueous electrolyte batteries may provide design options that are not available in organic electrolyte-based battery configurations, such as but not limited to LIBs. More specifically, AMIBs have improved safety and flexibility in vehicle design at reduced system costs compared to LIBs because AMIBs including aqueous lithium-ion batteries (ALIB) use the highly reversible ion-intercalation principle of conventional LIBs but with lower-cost, nonflammable aqueous electrolytes.

Further, the present disclosure relates to battery configurations including at least one electrode comprising OEMs including but not limited to, OCCs. The OEMs of the present disclosure are configurable to operate as both the anode and cathode or to couple with existing cathodic and anodic materials, including but not limited to lithium mixed oxides. In these configurations, the OEM applications in AMIBs demonstrate inorganic and organic hybrid redox couples. As disclosed herein, these redox couples appear to satisfy certain technical performance targets for energy density both in weight and in volume. Further, these properties are maintained in AMIB configurations comprising at least one organic electrode. Thus, organic electrode AMIB configurations disclosed herein represent an additional reduction in the cost of producing a battery, without reduction in cyclability and energy/power density.

Figure 1:
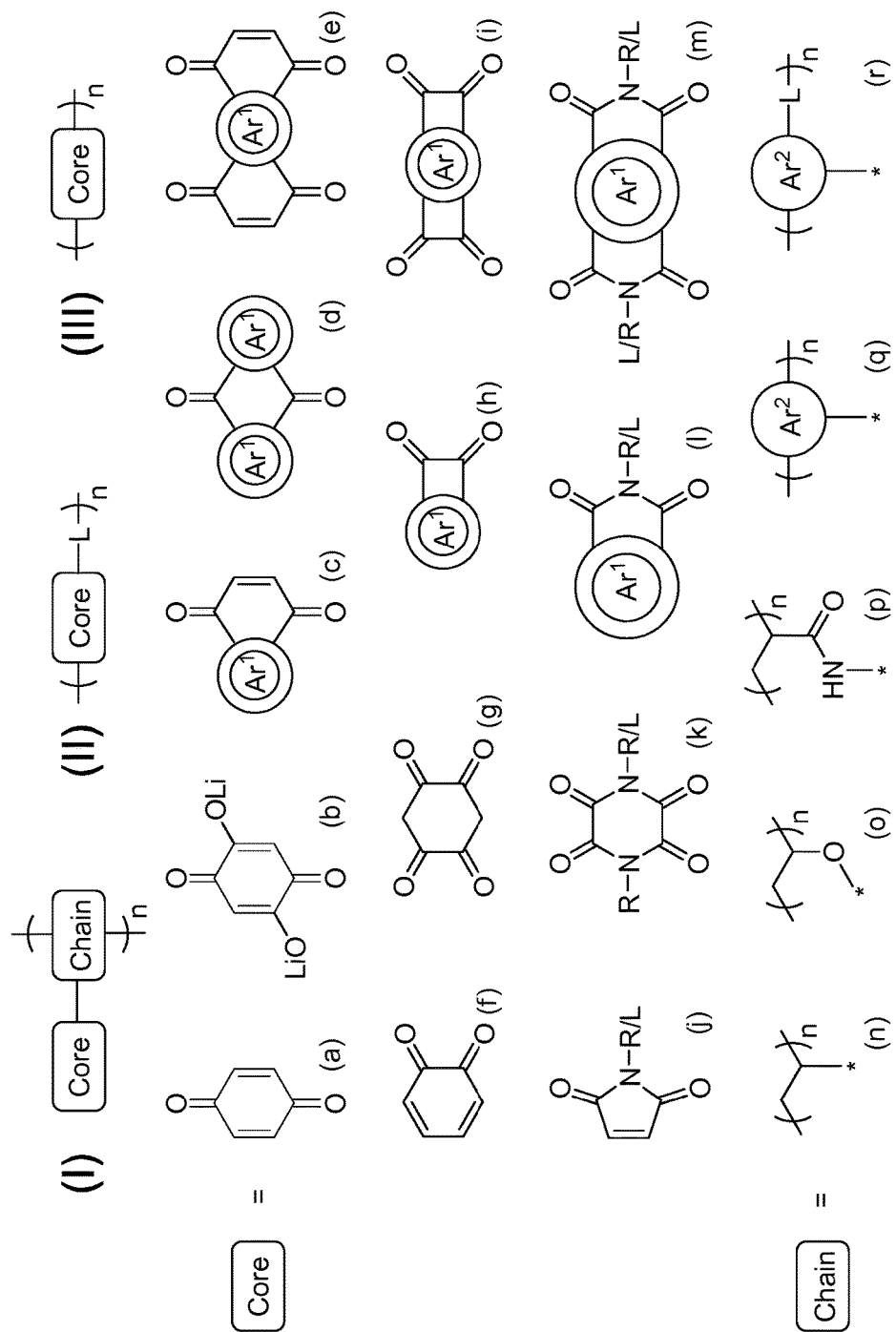
FIG. 1 illustrates representative molecular structures of the organic electrode materials (OEMs) for implementation as electrode materials for an AMIB.

ORGANIC ELECTRODE MATERIALS: FIG. 1 illustrates representative molecular structures of the exemplary OEMs for implementation as electrode materials for an AMIB. Generally, OCCs are used as the anodic material for an AMIB. The OCCs are characterized by reversibly reducible R—C(=O)—R' groups. Suitable OCCs comprise at least one structural formula illustrated in FIG. 1. The three structural formulas comprise (I) structures where electroactive cores are attached to a poly-/oligomer segment, (II) structures where electroactive cores are linked with linkers in-between, and (III) structures where electroactive cores are directly connected to one another. In the structural formulas (I), (II), and (III), the core comprises carbonyl group. With respect to the structural formula (I) the chain comprises any polymer or oligomer. Likewise, in structural formula (II), L comprises a moiety chosen from the group consisting of dicarbonyl, NH, O, S, CH$_2$, (CH$_2$)$_2$, (CH$_2$)$_3$, (CH$_2$)$_4$, (CH$_2$)$_6$, optionally substituted 5-6 membered aryl/heteroaryl groups, and biaryls consisted of two identical or different optionally substituted 5-6 membered aryl/heteroaryl groups. Without limitation, "n" indicates the average number of repeating units in the formula. The average number of repeats is at least 2.

FIG. 1 likewise illustrates exemplary core structures (a) through (m) that fit within the three OCC structural formulas (I)-(III). In the core structures (a) through (m), Ar$^1$ comprises at least one moiety chosen from the group consisting of naphthalene, perylene, optionally substituted 5-6 membered aryl/heteroaryl groups, and biaryls consisted of two identical or different optionally substituted 5-6 membered aryl/heteroaryl groups. Likewise, in the core structures (a)-(m), R comprises at least one moiety chosen from H, CH$_3$, or C$_2$H$_5$.

These OCCs are generally insoluble even at the reduced state and show stable capacity retention in both organic and aqueous electrolytes. The employed electroactive moieties without limitation include 1,4-benzoquinone, 1,2-benzoquinone, 1,2-bicarbonyl, diimide, and their derivatives. Aromatic rings can be incorporated to fine-tune the properties of the OCCs. Without limitation by any particular theory, the structural variety and design strategy of organic compounds permit predictable tuning of their redox potential in a wide range in order to fulfill specific device requirements. The reduced form of these structures coordinated to metal-ions, which are prepared via (electro)chemical reduction or formed in situ during charge-discharge, are also within the scope of the disclosure. The disclosed OCCs can demonstrate the characteristics for implementation as electrode materials for ALIBs. As noted hereinabove, these OEMs are merely representative and related configurations of the OEMs are considered within the scope of the present disclosure.

Figure 2:
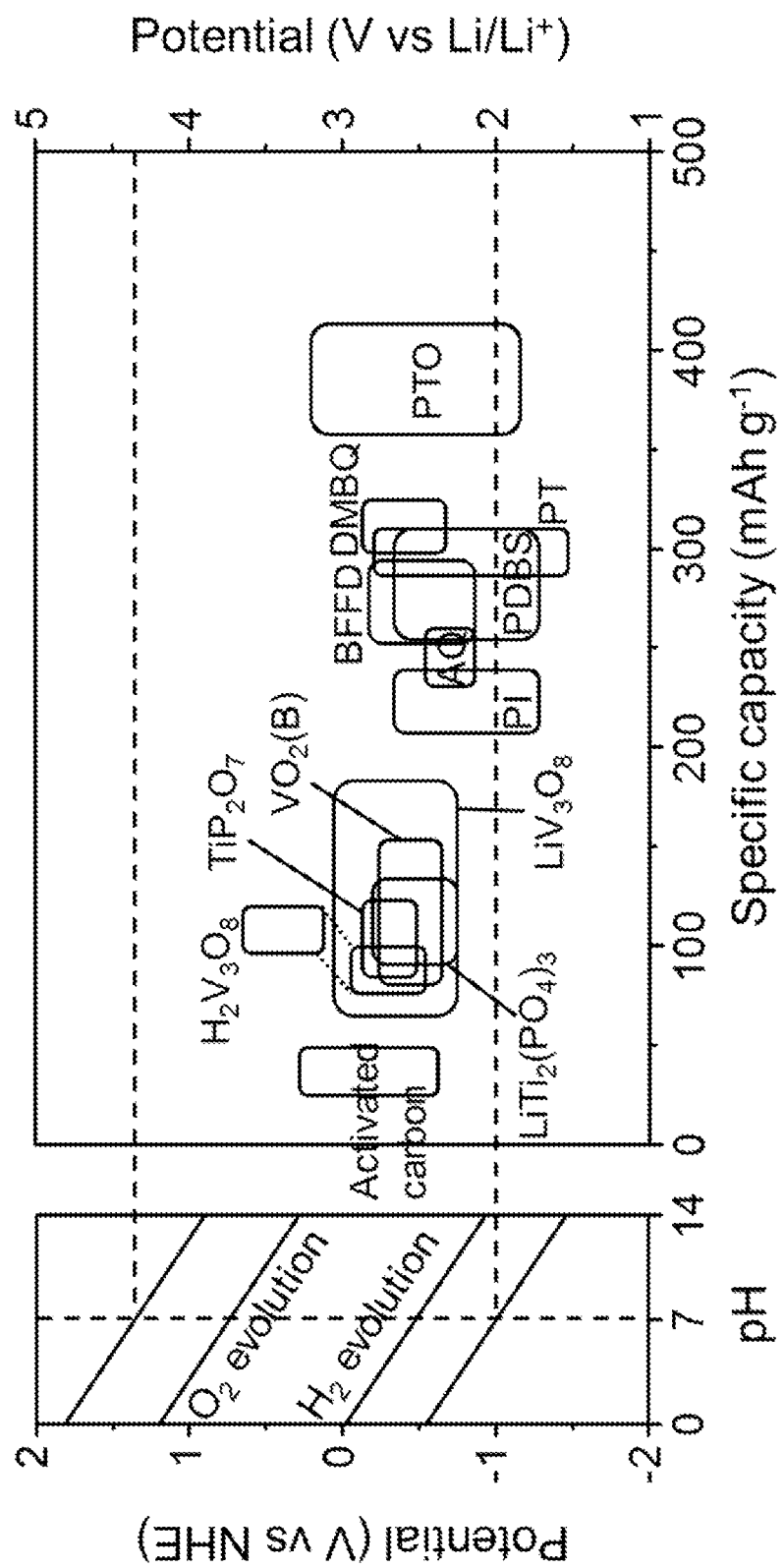
FIG. 2 illustrates $O_2/H_2$ evolution potential of water as a function of pH as compared to the potential and capacity of state-of-the-art anode materials for ALIBs (on the left) and the disclosed organic carbonyl compounds (OCCs) (on the right)

ORGANIC ELECTRODE POTENTIALS: Referring now to FIG. 2, the $O_2/H_2$ evolution potential of an exemplary aqueous electrolyte model, in this case water, as a function of pH is illustrated. More specifically, the thermodynamic stability of water is illustrated by solid lines and the dashed lines show the kinetic stability range for aqueous electrolytes considering the over-potentials for gas evolution. In exemplary embodiments of the present disclosure, the organic electrode materials are selected and configured to have a potential within the range of the kinetic stability, including the gas evolution over-potentials, at a pH 7.

The electrochemical characteristics of the OCCs illustrated in FIG. 1 are summarized in TABLE 1. Exemplary OCCs include anthraquinone (AQ), benzofuro[5,6-b]furan-4,8-dione (BFFD), 2,5-dimethoxy-1,4-benzoquinone (DMBQ), poly(2,5-dihydroxy-1,4-benzoquinonyl sulfide (PDBS), poly(pyromellitic diimide) (PI), 5,7,12,14-pentacenetetrone (PT), and pyrene-4,5,9,10-tetraone (PTO), without limitation.

TABLE 1

OCC Electrochemical Characteristics

| Name | MW | Number of carbonyls | Theoretical Specific Capacity (mAh/g) | Observed Specific Capacity (mAh/g) | Average Reduction Potential (V vs. Li/Li$^+$) |
|---|---|---|---|---|---|
| AQ | 208.2 | 2 | 257 | 239 | 2.27 |
| BFFD | 188.1 | 2 | 285 | 257 | 2.45 |
| DMBQ | 168.2 | 2 | 319 | 312 | 2.60 |
| PDBS | 170.1 | 2 | 315 | 228 | 2.05 |
| PI | 257.2 | 4 | 417 | 237 | 2.08 |
| PT | 338.3 | 4 | 319 | 300 | 2.10 |
| PTO | 262.2 | 4 | 409 | 360 | 2.59 |

Referring still to FIG. 2, the potentials of known metal oxide electrodes and exemplary OEMs as a function of specific capacity are illustrated. Generally speaking metal oxide electrodes exhibit specific capacities that do not exceed 200 mAh/g. The metal oxide electrodes are conventionally found in ALIBs. However, the specific capacities of the OEMs are greater than 200 mAh/g. In FIG. 1, the exemplary OEMs include the previously discussed OCCs. Thus, a battery configured with the OEMs disclosed herein provides a method of increasing the specific capacity of a battery.

TABLE 2

OEM Electrochemical Characteristics

| Name | MW | Number of Active Carbonyls | Theoretical Specific Capacity (mAh/g) | Average Reduction Potential (V vs. Ag/AgCl) |
|---|---|---|---|---|
| PAQS | 238 | 2 | 225 | −0.80 |
| PBDTD | 218 | 2 | 246 | −0.45 |
| PBDTDS | 250 | 2 | 214 | −0.42 |
| PBFFD | 186 | 2 | 288 | −0.38 |
| PBFFDS | 218 | 2 | 246 | −0.34 |
| PPQ | 206 | 2 | 260 | −0.45 |
| PPTO | 260 | 4 | 412 | −0.46 |
| PNDI | 264 | 2 | 203 | −0.44 |
| PNDIE | 292 | 2 | 183 | −0.56 |
| PNDIB | 340 | 2 | 158 | −0.55 |
| PPDIE | 242 | 2 | 221 | −0.79 |

ELECTRODE AND CELL FABRICATION: The OEM electrodes are fabricated by coating a support with a mixture containing at least one OEM. Generally, the mixture is coated onto a support and pressed and/or dried to form the electrode. Alternatively, the mixture may be compressed in contact with a foil, foam, or mesh. More specifically, the mixture comprises a dispersion of at least one OEM, conductive carbon, and at least one fluoropolymer. In certain configurations, the mixture comprises a polar solvent such as but not limited to N-methyl-2-pyrrolidone (NMP), ethanol, and isopropanol. The electrochemical characteristics of some exemplary OEMs are summarized in TABLE 2.

The mixture comprises a dispersion of OEM, conductive carbon, and a fluoropolymer. The concentration of the OEM is between about 20 wt. % and about 90 wt. %, and in certain configurations between about 30 wt. % and about 80 wt. %. The conductive carbon concentration is between about 5 wt. % and about 75 wt. %, and in certain configurations between about 10 wt. % and about 60 wt. %. The fluoropolymer concentration is between about 1 wt. % and about 30 wt. % and in certain configurations between about 5 wt. % and about 25 wt. %. The fluoropolymer may comprise at least one chosen from polyvinylidene fluoride (PVDF) and polytetrafluoroethylene (PTFE).

The support is configured to be a current collector. Non-limiting examples of current collectors comprise a metallic foam, foil, or mesh. The metal of the foam, foil, or mesh comprises at least one transition metal, including Group VIB, VIIB, VIII, IB, IIB, and IIIA metals. In configurations, the foam, foil, or mesh comprises a Group VIII metal, such as but not limited to nickel (Ni); alternatively, the foam, foil, or mesh comprises a Group IIIA metal such as but not limited to aluminum (Al). Further, the foam, foil, or mesh may be coated by a second metal chosen from the transition metal groups listed hereinabove. Likewise, the second metal is a Group VIII metal, such as but not limited to nickel (Ni). In alternative configurations, the foam, foil, or mesh may comprise stainless steel.

Generally, the mixture coats the support and is pressed and/or dried to form the OEM electrode. Alternatively, the mixture may be forced into the support prior to drying. Occasionally, pressure is used to force the mixture into the foam or mesh supports. In certain instances, the pressure comprises mixture injections, compression of the mesh or foam, and the compression of mesh or foam loaded with the (dried) mixture. Pressure may include 0.3-2.0 MPa without limitation.

ORGANIC-METAL ION HYBRIDS BATTERIES: In some configurations, the disclosed electrode materials are configurable for implementation in AMIBs. In these configurations, the batteries comprise an electrode capable of intercalation by/coordination to at least one metal-ion chosen from the group comprising lithium (Li), sodium (Na), magnesium (Mg), calcium (Ca), and in certain instances aluminum (Al). Again, without limitation by any particular theory, the batteries configured thusly use a group of electrochemical redox couples that leverage metal-ion battery electrode chemistry characteristics to potentially provide a reliable and high capacity electrode material to meet certain technical performance parameters for AMIBs in commercial applications.

COUNTER ELECTRODE FABRICATION: Counter electrodes containing compounds capable of metal-ion (de)intercalation/(un-)coordination may be utilized. Generally, the counter electrodes comprise between about 50 wt. % and about 100 wt. % of compounds capable of metal-ion (de)intercalation/(un-)coordination; alternatively the counter electrodes comprise between about 60 wt. % and about 95 wt. % metal-containing compounds. For the fabrication of aqueous lithium-ion batteries, non-limiting exemplary compounds capable of metal-ion (de)intercalation/(un-)coordination include $LiCoO_2$, $LiMn_2O_4$, $LiNi_{1/3}Co_{1/3}Mn_{1/3}O_2$, $LiNi_{0.8}Co_{0.15}Al_{0.05}O_2$, lithium-rich mixed oxides, $LiNi_{0.5}Mn_{1.5}O_4$ $Ni(OH)_2$, $MnO_2$, carbonyl compounds, organosulfur compounds, radical compounds, non-conjugated polymers, and combinations thereof. In instances, the counter-electrodes are fabricated in a mixture method as described hereinabove. Additionally, aqueous solutions of one or a mixture of lithium salts such as but not limited to $LiNO_3$, $Li_2SO_4$, LiCl, and LiOH ($[Li^+]$=0.5-14.0 M) are used as the electrolyte.

Figure 3:
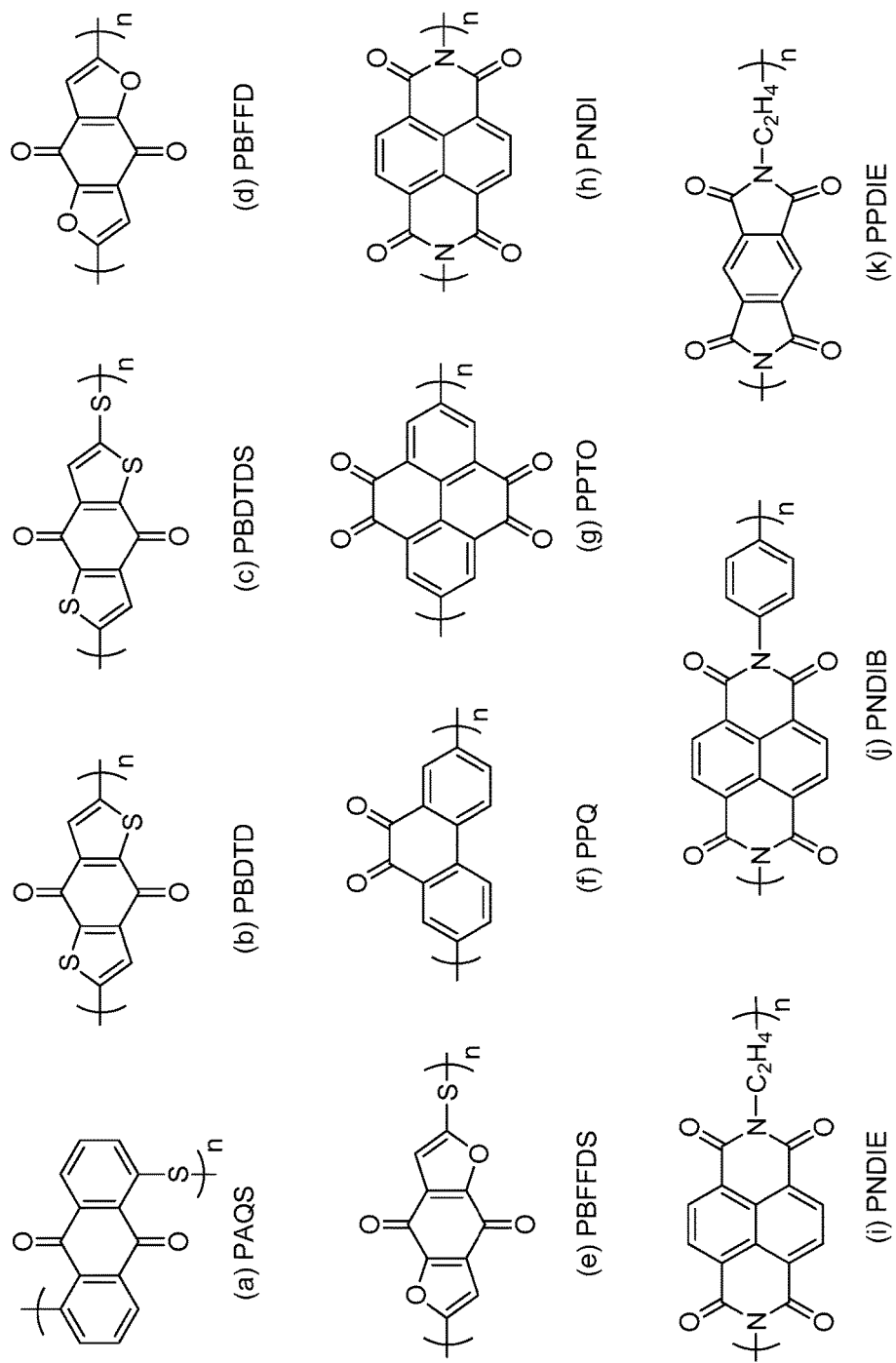
FIG. 3 illustrates molecular structures of exemplary OEMs.

In certain configurations, the disclosed batteries uses a group of electrochemical redox couples that leverage lithium-ion battery cathode chemistry characteristics to potentially provide a reliable and high capacity anode material to meet certain technical performance parameters for ALIBs in commercial applications. Certain exemplary OEMs that are sustainable, low-cost, and high-energy are illustrated in FIG. 3. One exemplary electrochemical redox couple of $LiMn_2O_4$/PAQS has the following reactions illustrated in Equation 1 [EQ 1] and Equation 2 [EQ 2].

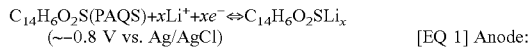

[EQ 1] Anode:

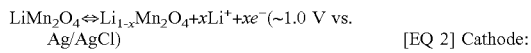

[EQ 2] Cathode:

Specifically, the aqueous electrolytes are composed of at least one metal salt as solute and an aqueous solvent which comprises at least 90 wt. % of water. The aqueous electrolytes may have a pH between about pH 2 and about pH 15. Alternatively, the aqueous electrolytes may have a pH between about pH 6 and about pH 14. In further configurations, the electrolytes may be chosen to most stably support the operation of the electrodes, including a cathode capable of metal-ion (de)intercalation/(un-)coordination and an OEM electrode.

Further, manipulation of the chemical structure, molecular weight, and degree of crystallinity of the OEMs provides increased stability and robustness, particularly in the instances of mechanical trauma or thermal runaway. Thus, the disclosed OEMs may be incorporated into an AMIB such that special protection is unneeded in commercial applications, including vehicular and industrial applications. Additionally, in the present disclosure, the battery configurations are multifunctional. Relating to the stability of the OEMs and the tunability of the electrolytes in the secondary or rechargeable, aqueous, metal-ion battery, the battery may be configurable as a structural member. Exemplary structural members may comprise frames, supports, trusses, chassis, or other components of electrical and mechanical equipment.

To further illustrate various illustrative embodiments of the present invention, the following examples are provided.

EXAMPLES

Example 1

PAQS (see FIG. 3a)

Figure 4:
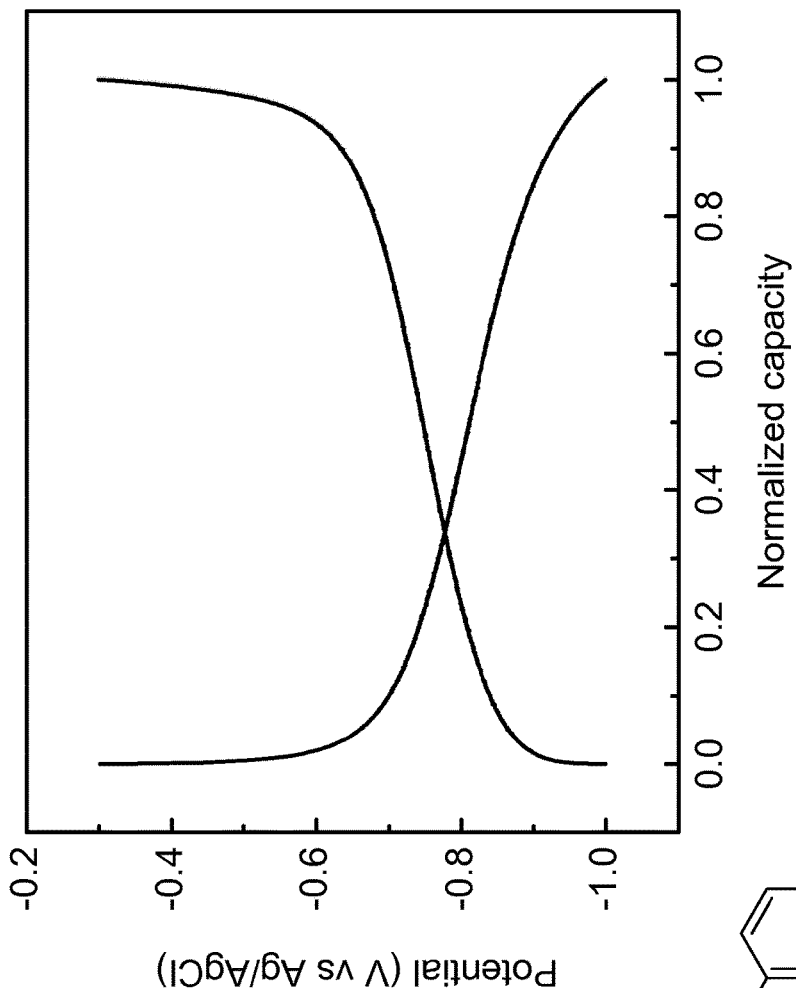
FIG. 4 illustrates the charge-discharge profile of PAQS in a 2.0 M $Li_2SO_4$ aqueous solution at pH 14 measured in a three-electrode cell at a rate for charge and discharge of 1 C (Coulomb)
Figure 4:
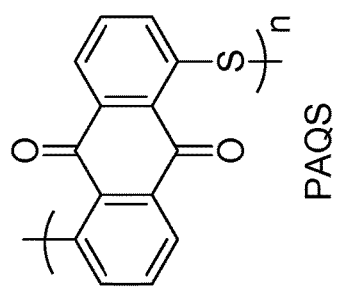
Figure 5:
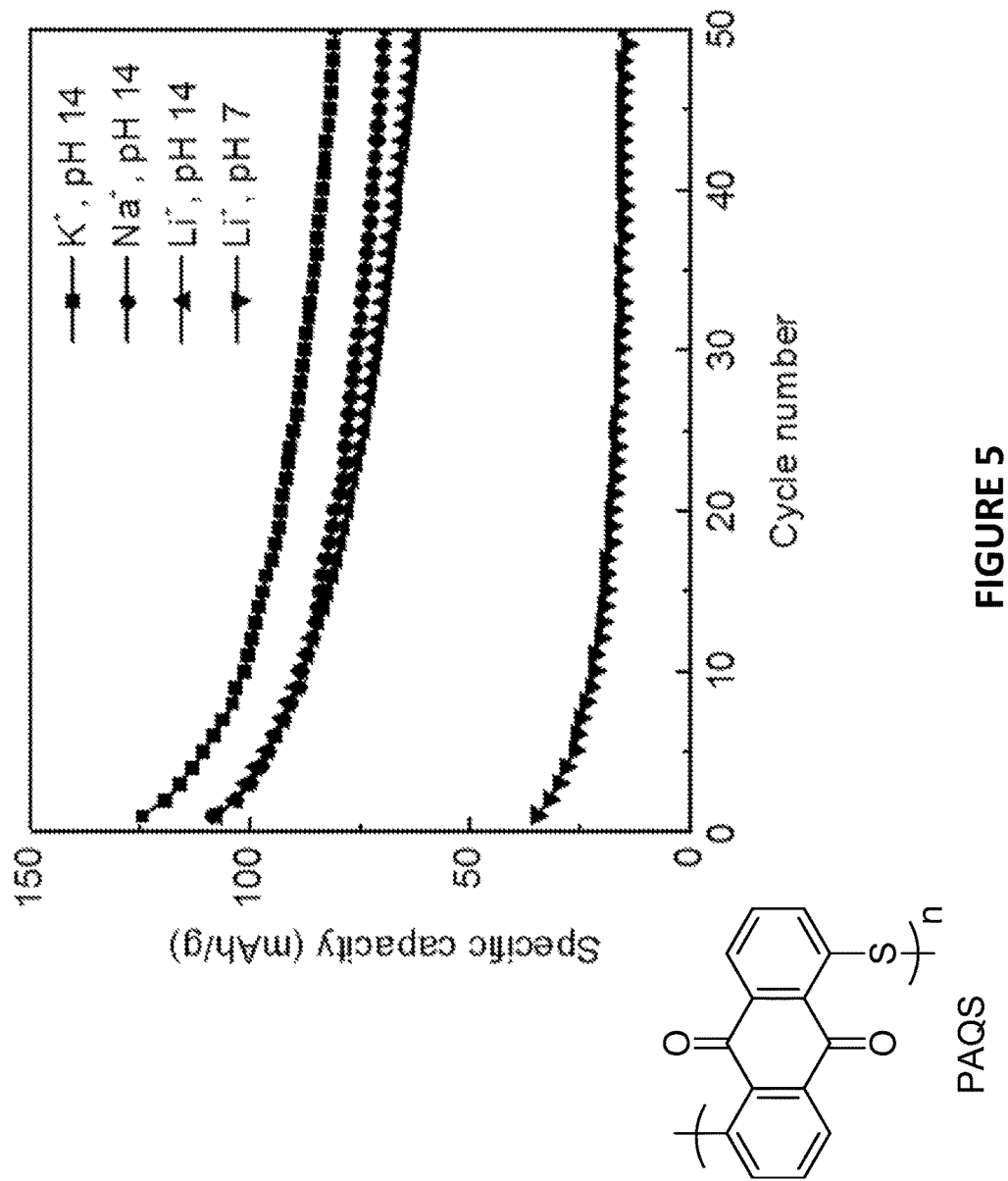
FIG. 5 illustrates the comparison of the capacity and cycling stability of PAQS in alkaline metal salt-based electrolytes ($[M^+]=5$ M) at neutral (pH 7) and basic (pH 14) conditions at a rate for charge and discharge of 1 C.
Figure 6:
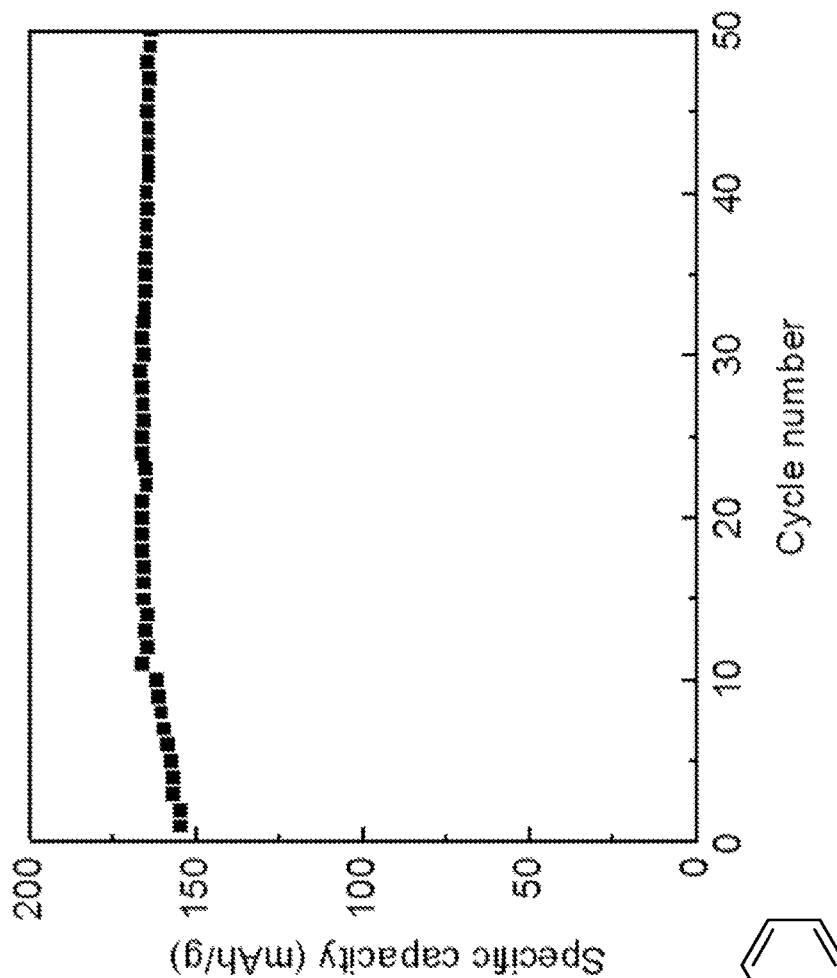
FIG. 6 illustrates the cycling performance of PAQS in a 2.0 M TEACl aqueous solution at pH 14 at a rate for charge and discharge of 1 C.
Figure 6:
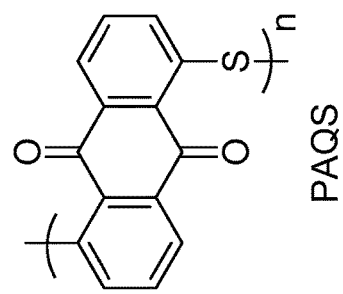

A mixture of PAQS (70 wt. %), Super-P carbon (20 wt. %), and polytetrafluoroethylene (10 wt. %) was pressed into a stainless steel mesh to form the working electrode. A glass fiber paper wet with an aqueous solution of $Li_2SO_4$ (2.0 M) and LiOH (1.0 M) is placed between the working electrode and a piece of activated carbon cloth serving as the counter electrode. Three-electrode coin cells are fabricated to demonstrate an average reduction potential of −0.80 V vs Ag/AgCl (FIG. 4). PAQS delivers reversible cycling performance when working in sodium (2.0 M NaCl+1.0 M NaOH)/potassium (2.0 M KCl+1.0 M KOH) salt-based electrolytes (FIG. 5). In particular, when tetraethylammonium (TEA) (2.0 M TEACl+1.0 M TEAOH) was used, no noticeable capacity decrease was observed after 50 cycles at 1 C rate (for both charge and discharge) (FIG. 6). A lower capacity was obtained when a neutral lithium salt-based electrolyte (2.5 M $Li_2SO_4$) was used.

Example 2

PBDTD (see FIG. 3b)

Figure 7:
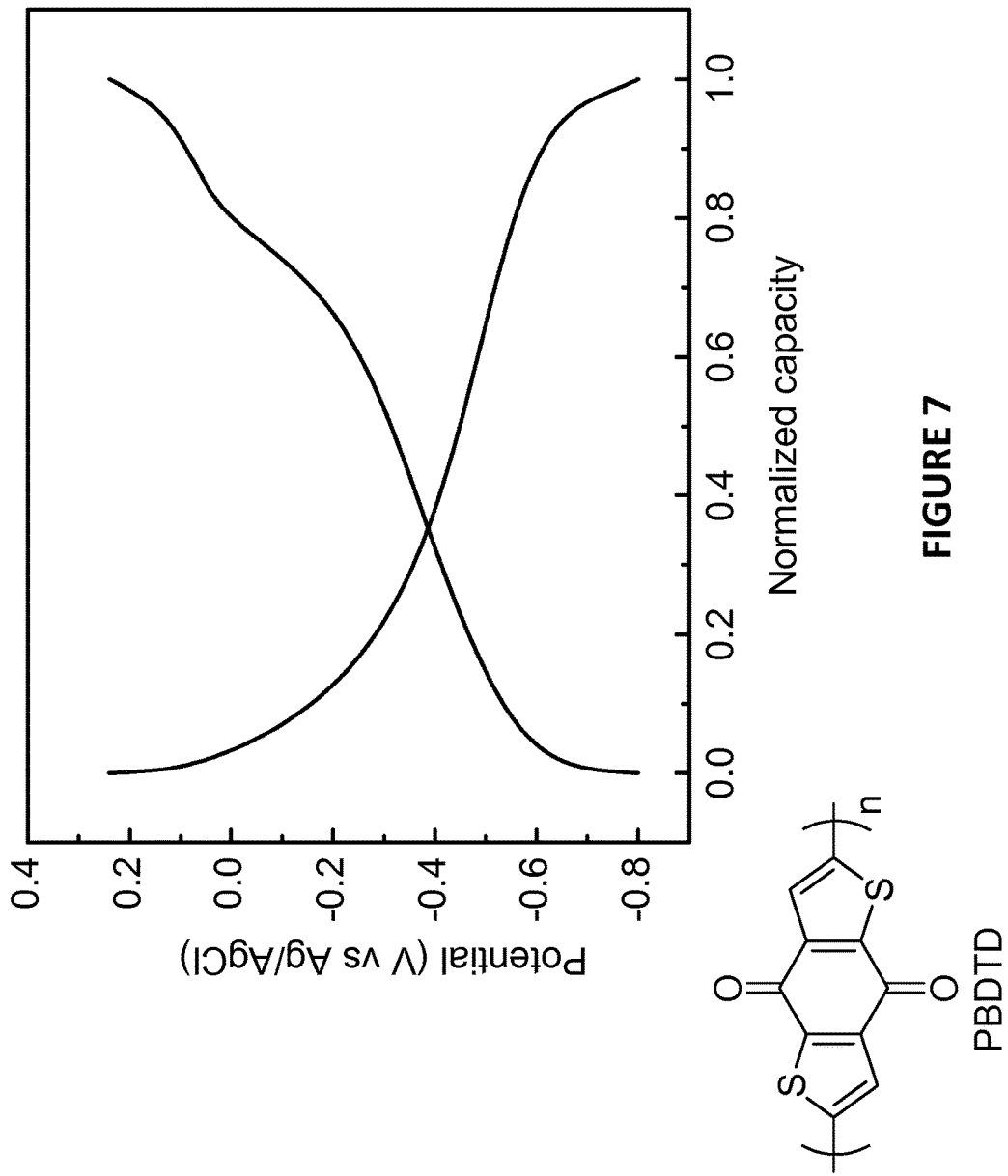
FIG. 7 illustrates the charge-discharge profile of PBDTD in a 2.5 M $Li_2SO_4$ aqueous solution at pH 7 measured in a three-electrode cell at a rate for charge and discharge of 1 C.
Figure 8:
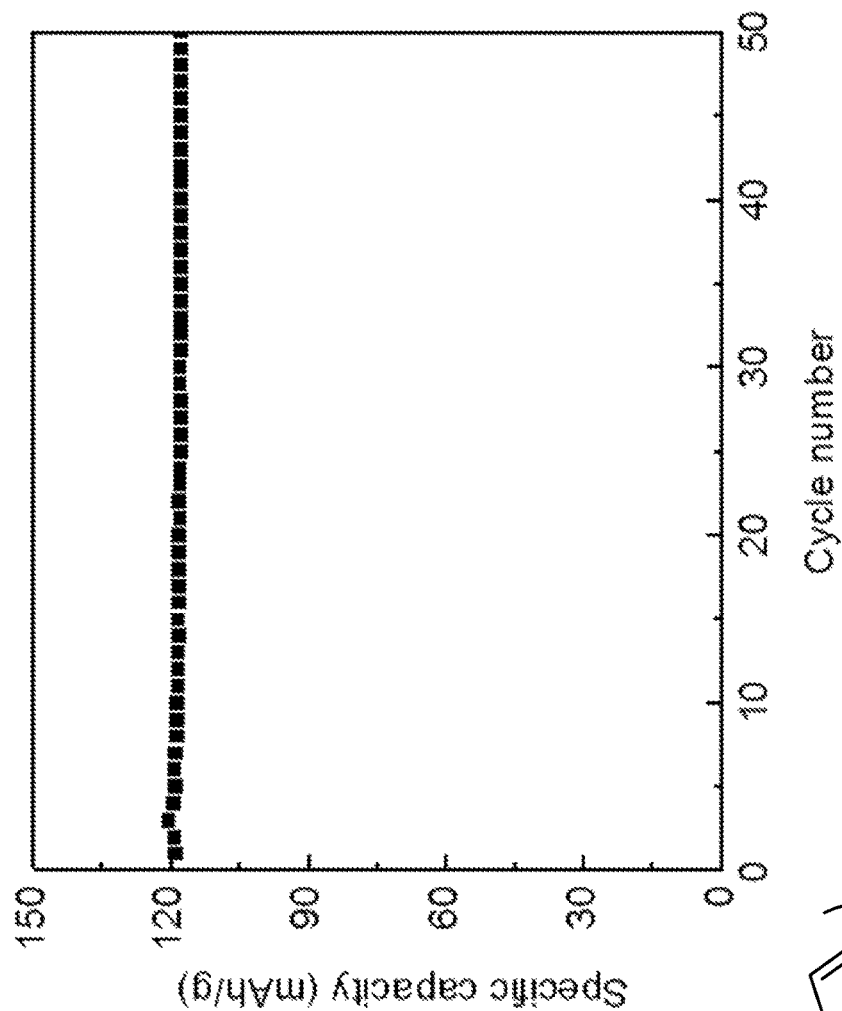
FIG. 8 illustrates the cycling performance of PBDTD in a 2.5 M $Li_2SO_4$ aqueous solution at pH 7 at a rate for charge and discharge of 1 C.
Figure 8:
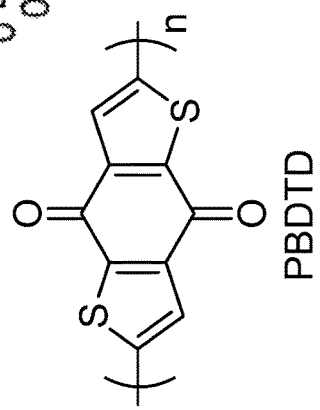
Figure 9:
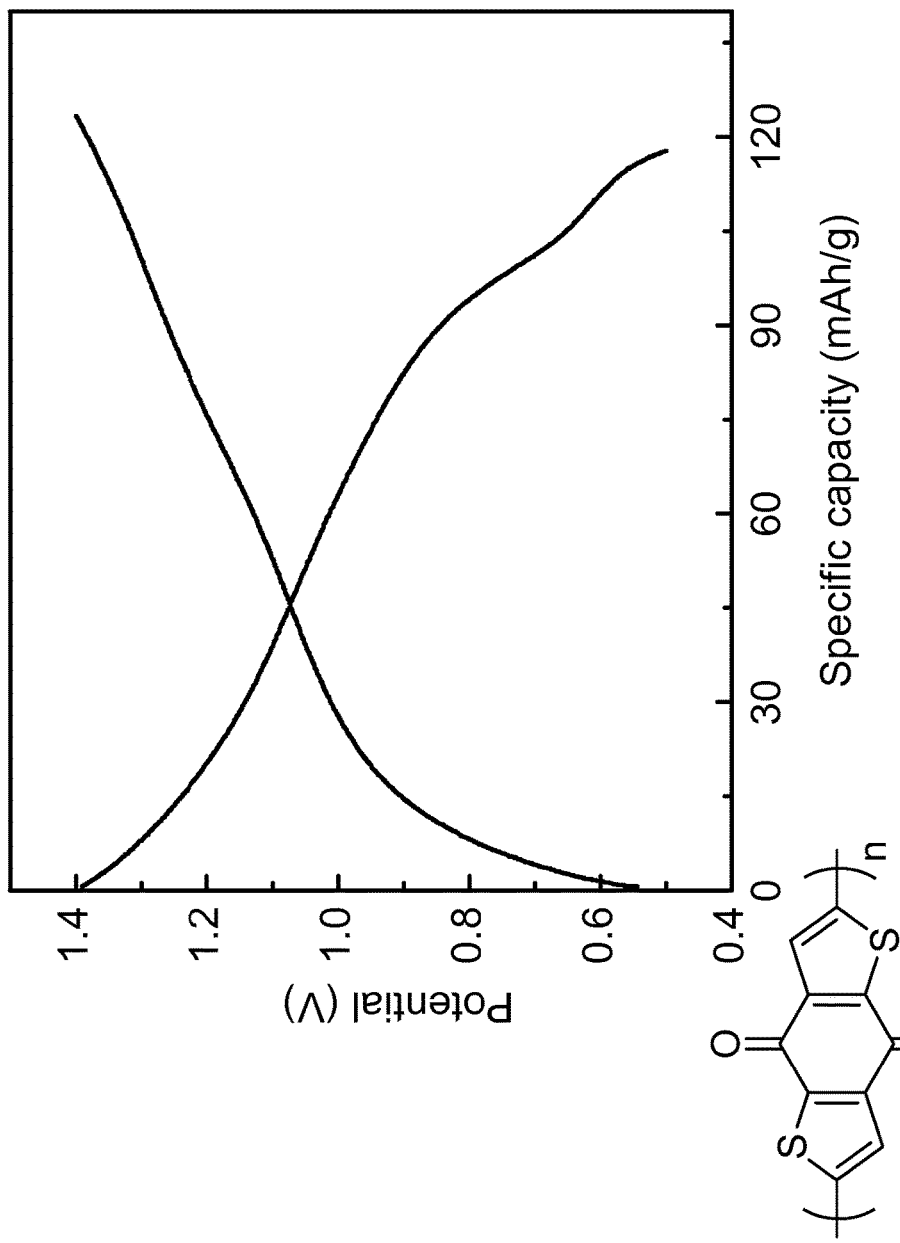
FIG. 9 illustrates the charge-discharge profile of a full cell comprising PBDTD as the anode and $LiMn_2O_4$ as the cathode with a 2.5 M $Li_2SO_4$ aqueous solution (pH 7) as the electrolyte at a rate for charge and discharge of 1 C.
Figure 10:
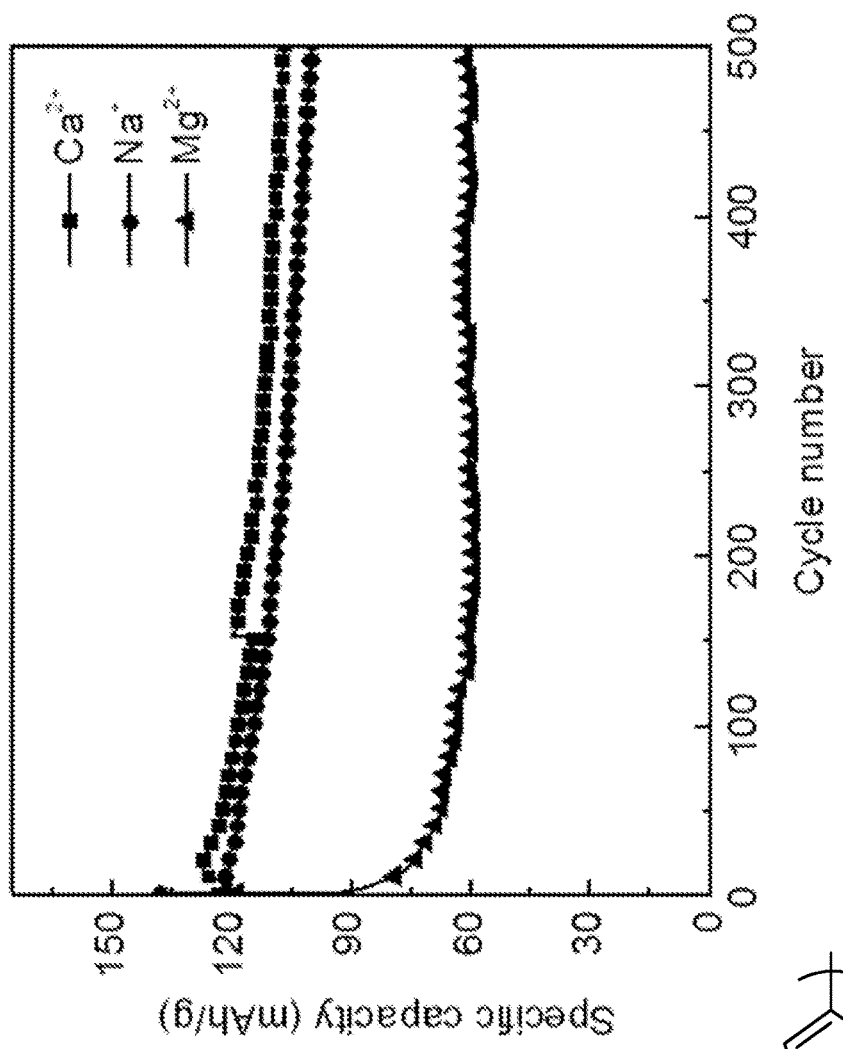
FIG. 10 illustrates the comparison of the capacity and cycling stability of PBDTD in sodium/alkaline earth metal salt-based electrolytes ($[Na^+]=5$ M and $[M^{2+}]=2.5$M, respectively) at pH 7 at a rate for charge and discharge of 1 C.
Figure 10:
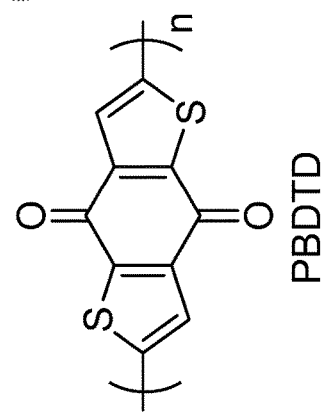
Figure 11:
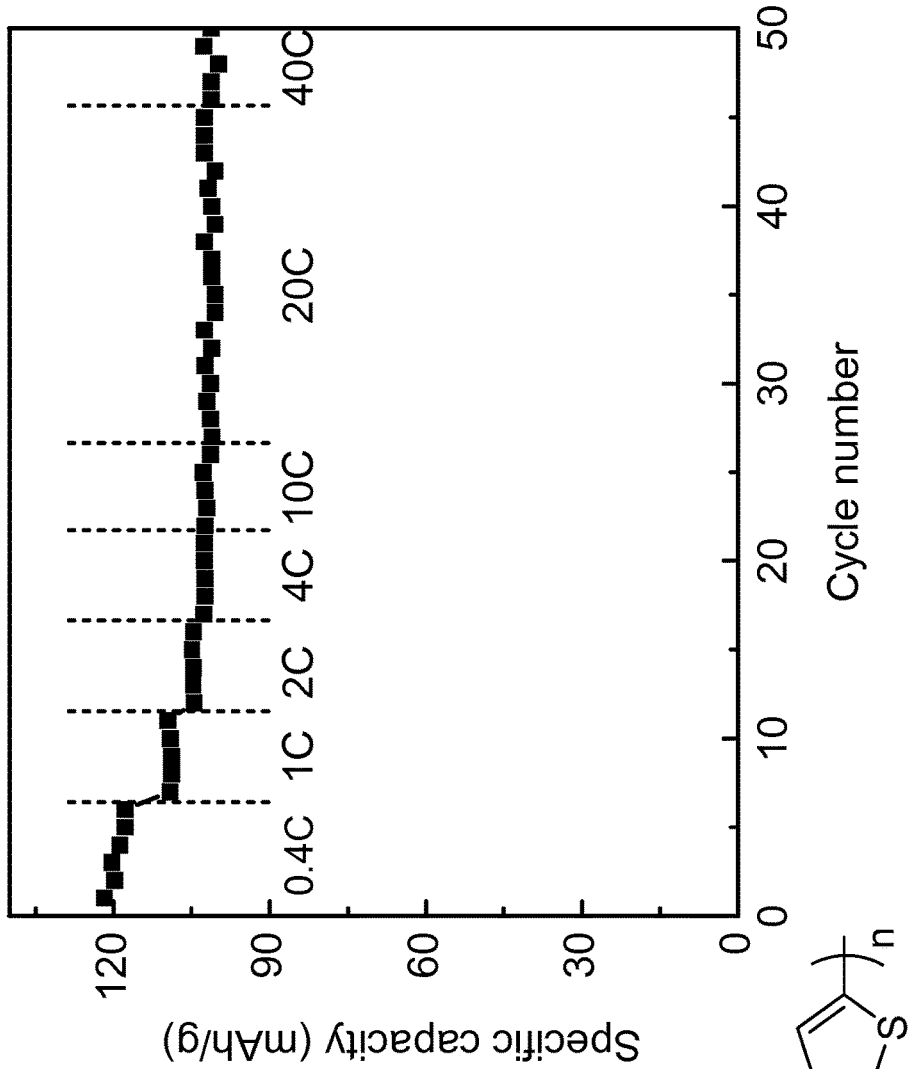
FIG. 11 illustrates the rate capability of PBDTD in a 2.5 M $Li_2SO_4$ aqueous solution at pH Tat the same rate for both charge and discharge.

A mixture of PBDTD (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.45 V vs Ag/AgCl (FIG. 7). Rate performance tested in two-electrode coin cells showed a 93% capacity retention at 10 C compared to that obtained at 1 C (FIG. 8). At 1 C rate (for both charge and discharge), no noticeable capacity decrease was observed after 50 cycles (FIG. 9). Alternatively, a mixture of $LiMn_2O_4$ (80 wt. %), Super-P carbon (10 wt. %), and polytetrafluoroethylene (10 wt. %) was pressed into a stainless steel mesh to form the counter electrode. Coin cells are fabricated to demonstrate an average discharge potential of 1.02 V (FIG. 10). PBDTD also delivered stable cycling performance when working in sodium (5 M $NaNO_3$)/calcium (2.5 M $Ca(NO_3)_2$) salt-based electrolytes (FIG. 11). When a magnesium salt-based electrolyte was used, a lower capacity but similar cycling stability was obtained.

Example 3

PBDTDS (see FIG. 3c)

Figure 12:
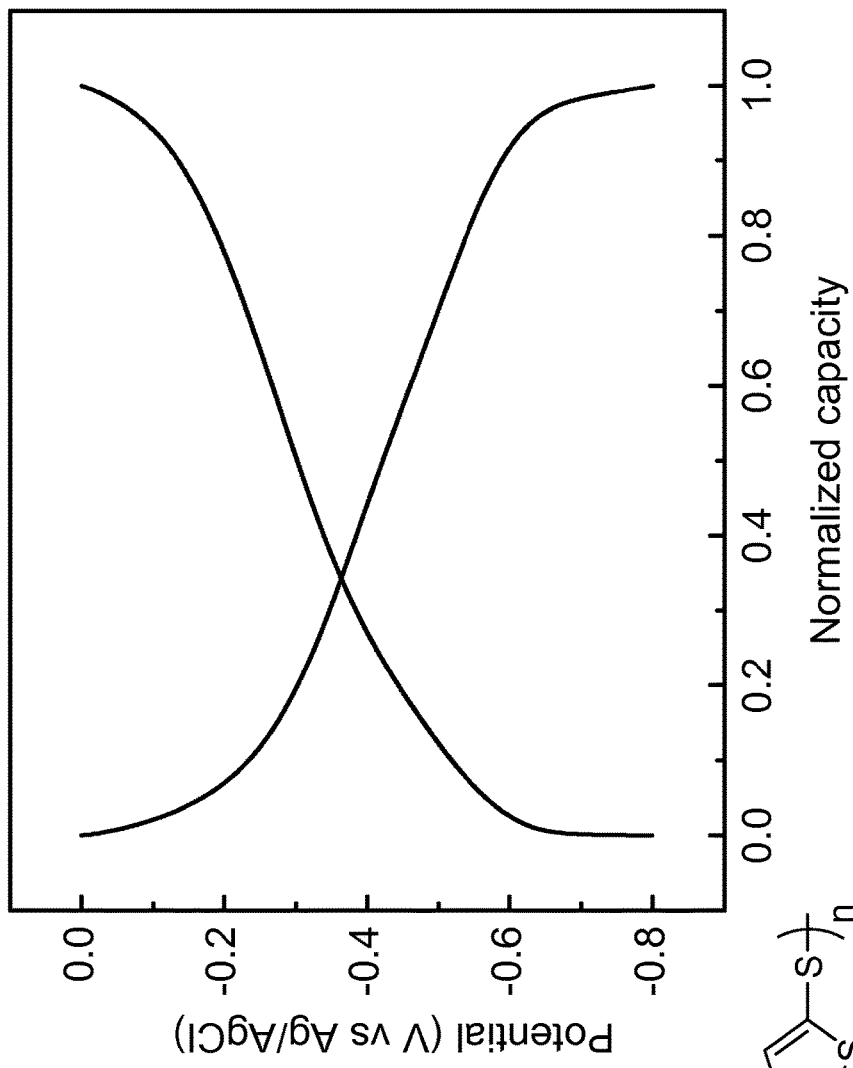
FIG. 12 illustrates the charge-discharge profile of PBDTDS in a 2.5 M $Li_2SO_4$ aqueous solution at pH 13 measured in a three-electrode cell at a rate for charge and discharge of 1 C.
Figure 13:
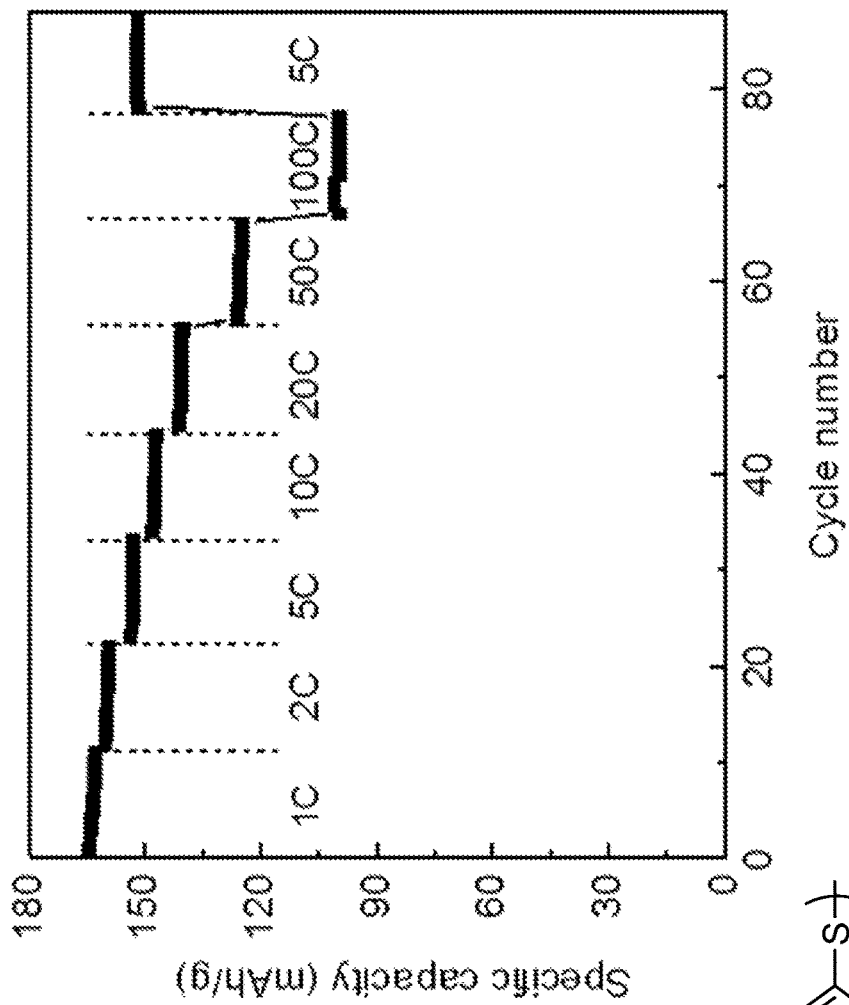
FIG. 13 illustrates the rate capability of PBDTDS in a 2.5 M $Li_2SO_4$ aqueous solution at pH 13 at the same rate for both charge and discharge.
Figure 13:
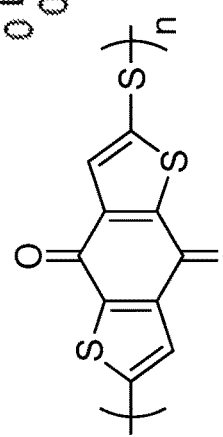

PBDTDS was synthesized with a similar method as that for PAQS. A mixture of PBDTDS (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) and LiOH (0.1 M) is placed between the working electrode and a piece of activated carbon cloth serving as the counter electrode. Three-electrode coin cells are fabricated to demonstrate an average reduction potential of −0.42 V vs Ag/AgCl (FIG. 12). Rate performance tested in two-electrode coin cells showed 91% and 60% of capacity retention at 10 C and 100 C, respectively (FIG. 13). At 10

Figure 14:
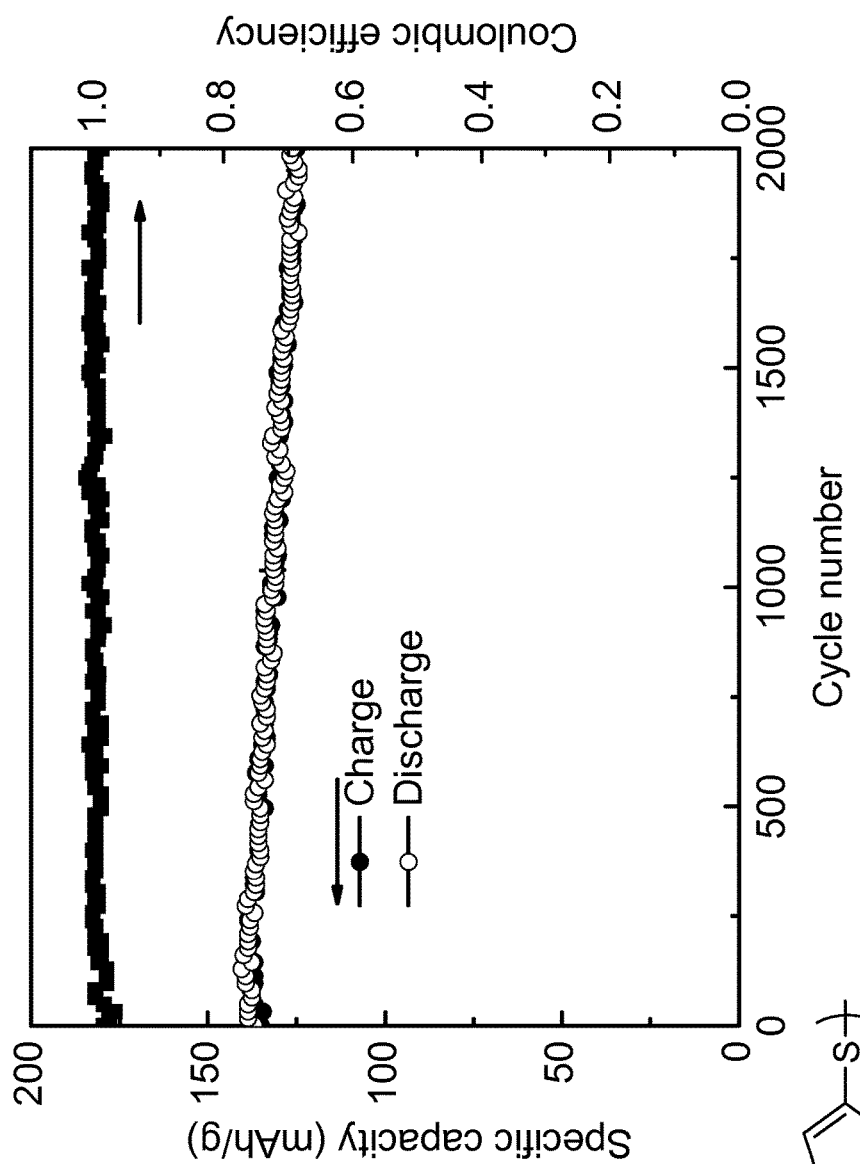
FIG. 14 illustrates the cycling performance of PBDTDS in a 2.5 M $Li_2SO_4$ aqueous solution at pH 13 at a rate for charge and discharge of 10 C.
Figure 15:
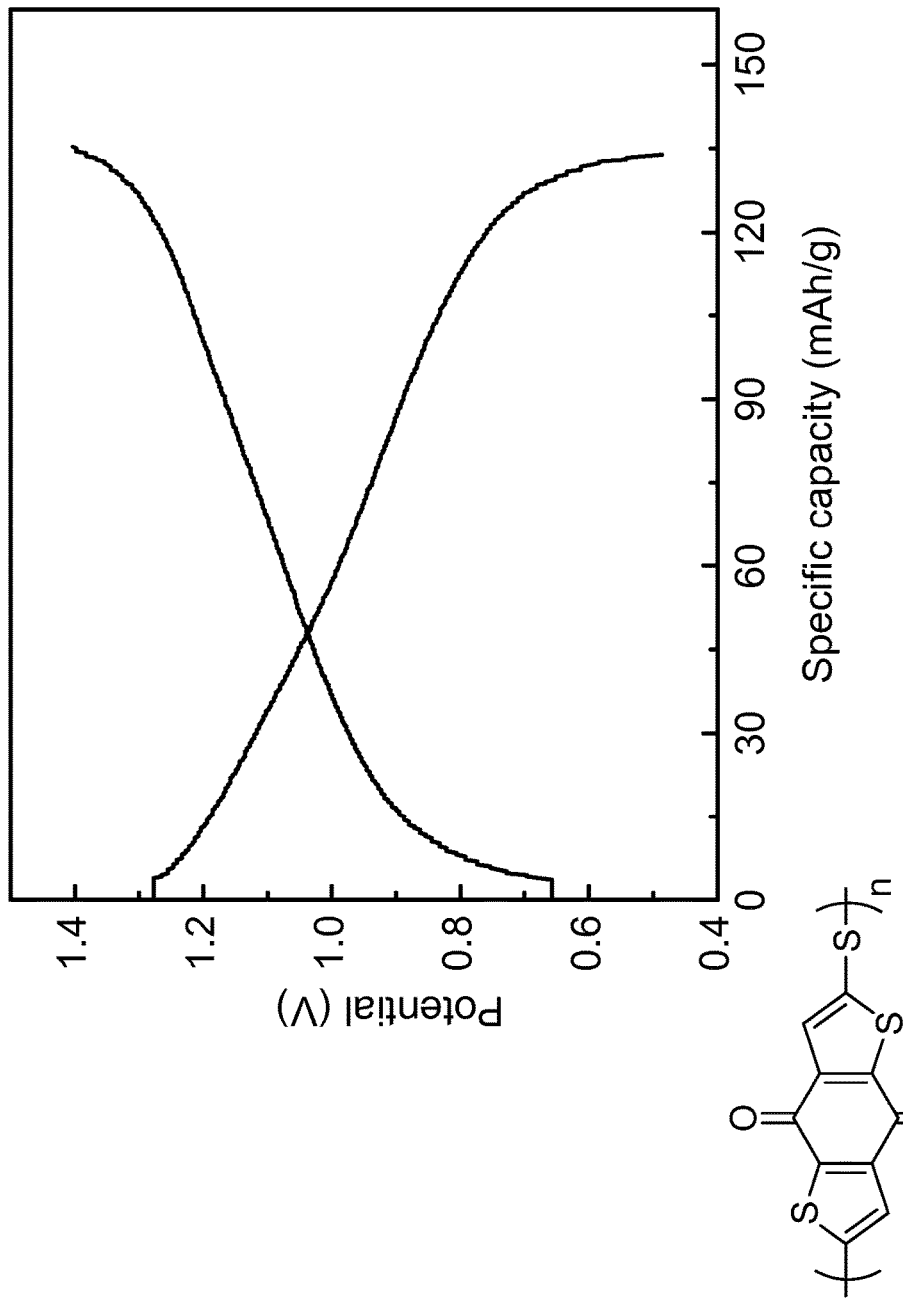
FIG. 15 illustrates the charge-discharge profile of a full cell comprising PBDTDS as the anode and $LiCoO_2$ as the cathode with a 2.5 M $Li_2SO_4$ aqueous solution (pH 13) as the electrolyte at a rate for charge and discharge of 5 C.
Figure 16:
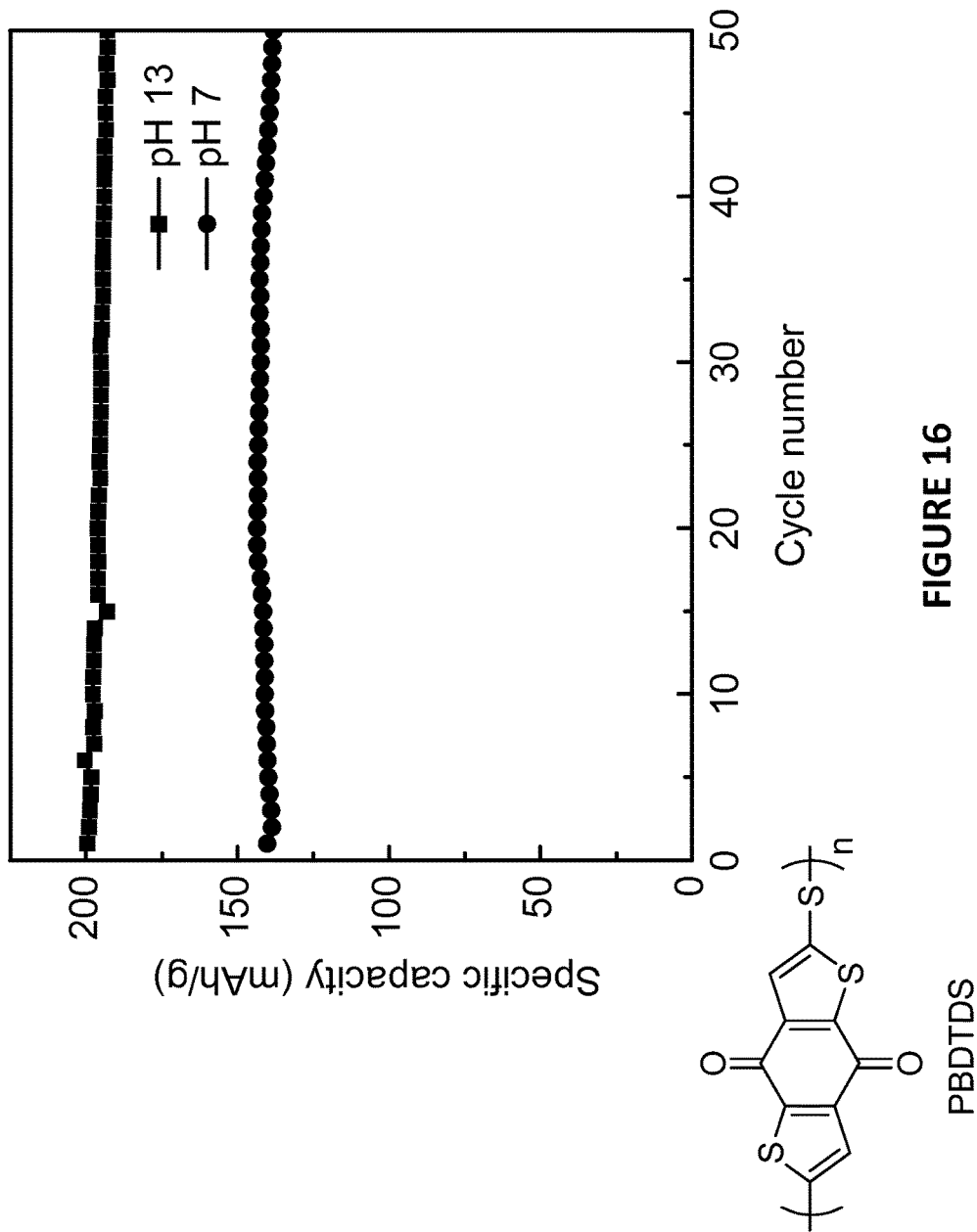
FIG. 16 illustrates the comparison of the capacity and cycling stability of PBDTDS in lithium salt-based electrolytes ([Li$^+$]=5 M) at neutral (pH 7) and basic (pH 13) conditions at a rate for charge and discharge of 1 C.

C rate (for both charge and discharge), 93% of the original capacity was maintained after 2000 cycles (FIG. 14). Alternatively, a mixture of $LiCoO_2$ (80 wt. %), Super-P carbon (10 wt. %), and polytetrafluoroethylene (10 wt. %) was pressed into a stainless steel mesh to form the counter electrode. Coin cells are fabricated to demonstrate an average discharge potential of 0.96 V (FIG. 15). When a neutral electrolyte was used, a lower capacity was obtained (FIG. 16).

Example 4

PBFFD (see FIG. 3d)

Figure 17:
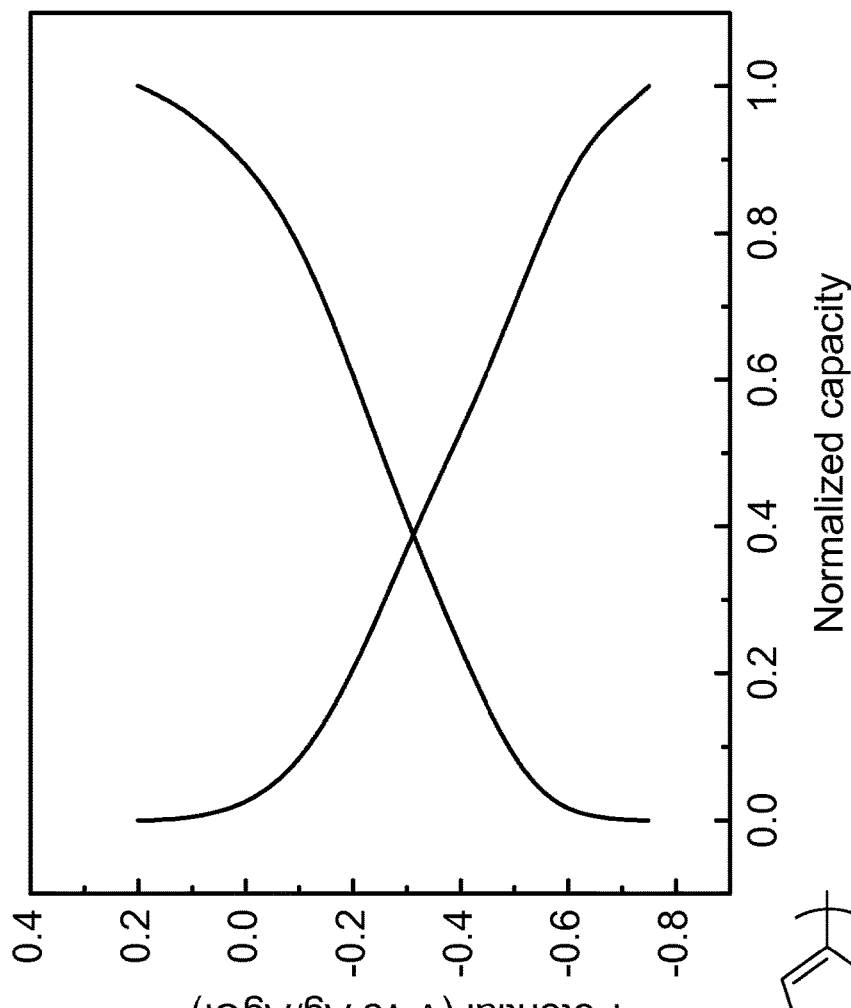
FIG. 17 illustrates the charge-discharge profile of PBFFD in a 2.5 M Li$_2$SO$_4$ aqueous solution at pH 7 measured in a three-electrode cell at a rate for charge and discharge of 1 C.
Figure 17:
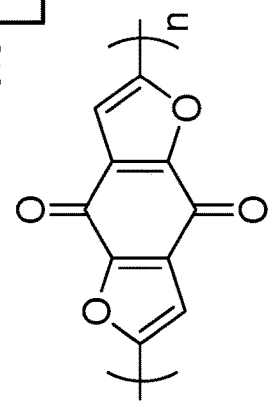

PBFFD was synthesized with a similar method as that for PBDTD. A mixture of PBFFD (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.38 V vs Ag/AgCl (FIG. 17).

Example 5

PBFFDS (see FIG. 3e)

Figure 18:
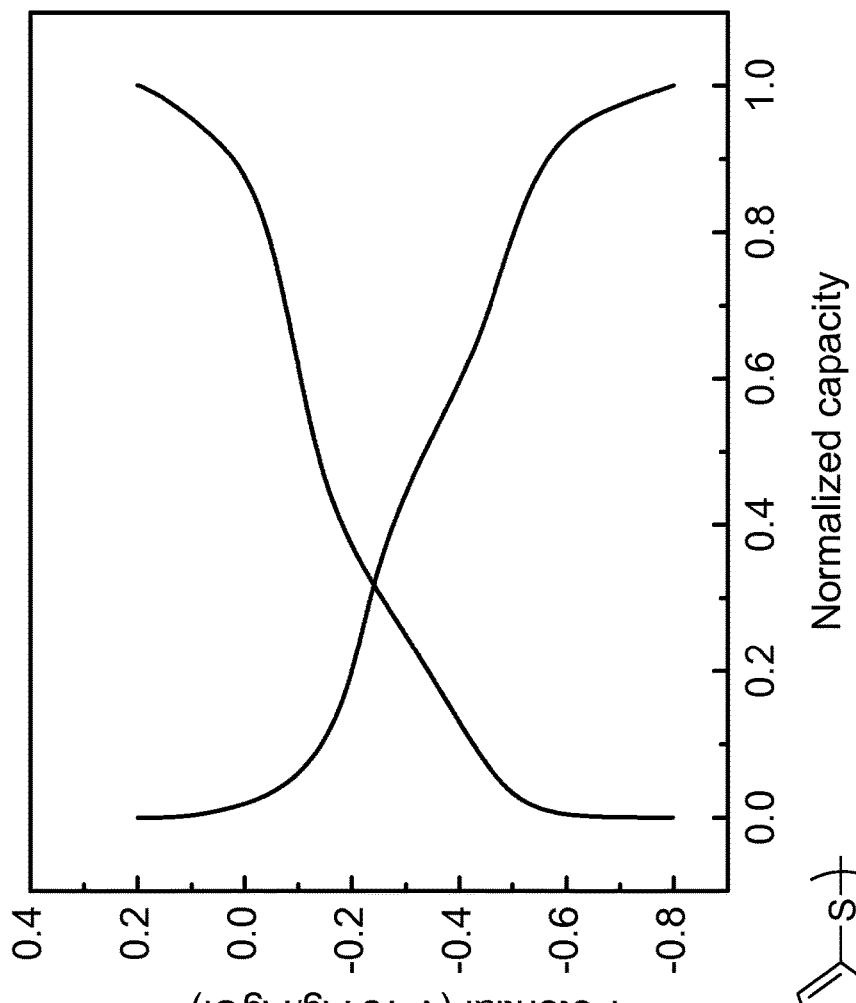
FIG. 18 illustrates the charge-discharge profile of PBFFDS in a 2.5 M Li$_2$SO$_4$ aqueous solution at pH 7 measured in a three-electrode cell at a rate for charge and discharge of 1 C.

PBFFDS was synthesized with a similar method as that for PAQS. A mixture of PBFFDS (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.34 V vs Ag/AgCl (FIG. 18).

Example 6

PPQ (see FIG. 3f)

Figure 19:
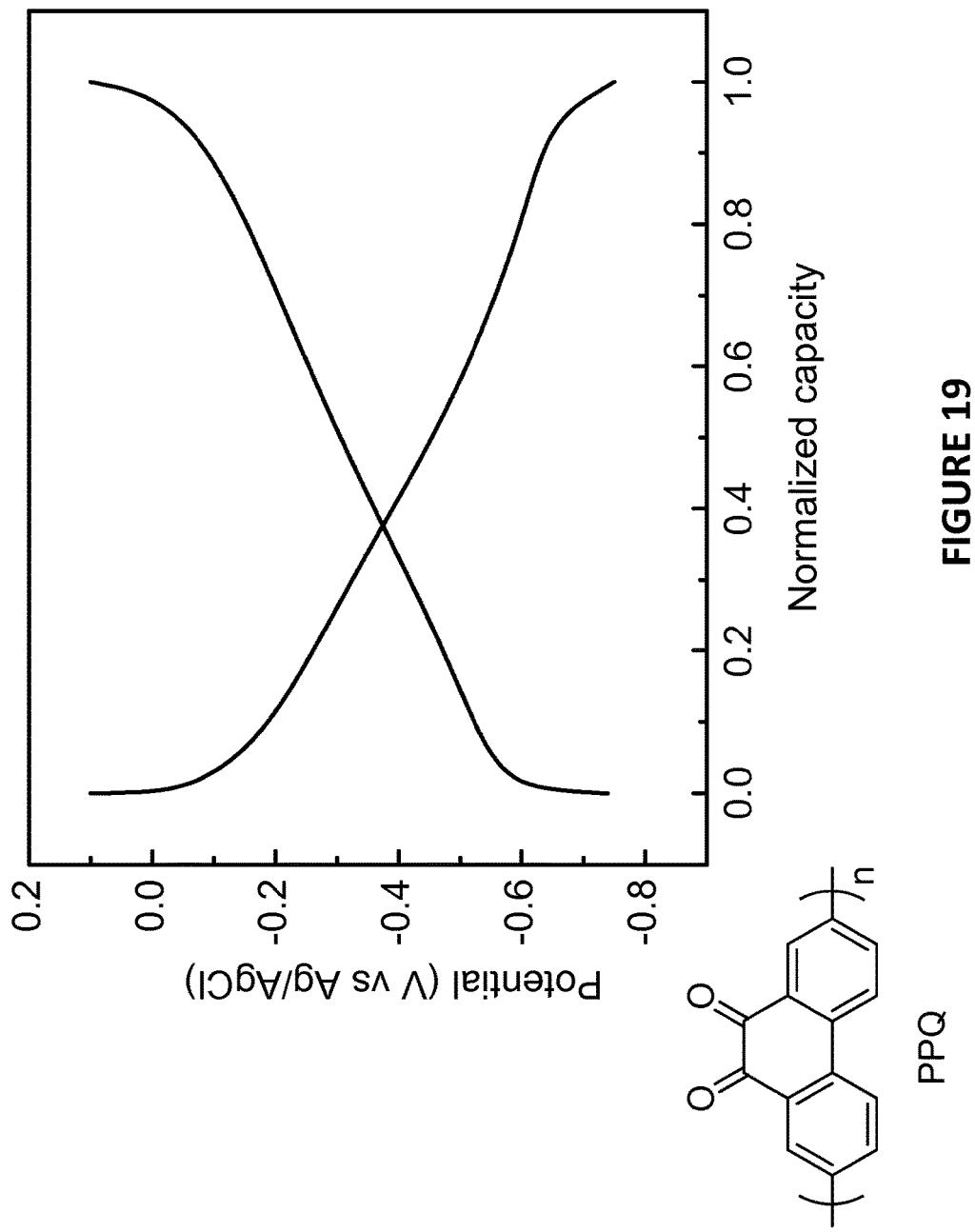
FIG. 19 illustrates the charge-discharge profile of PPQ in a 2.5 M Li$_2$SO$_4$ aqueous solution at pH 13 measured in a three-electrode cell at a rate for charge and discharge of 1 C.
Figure 20:
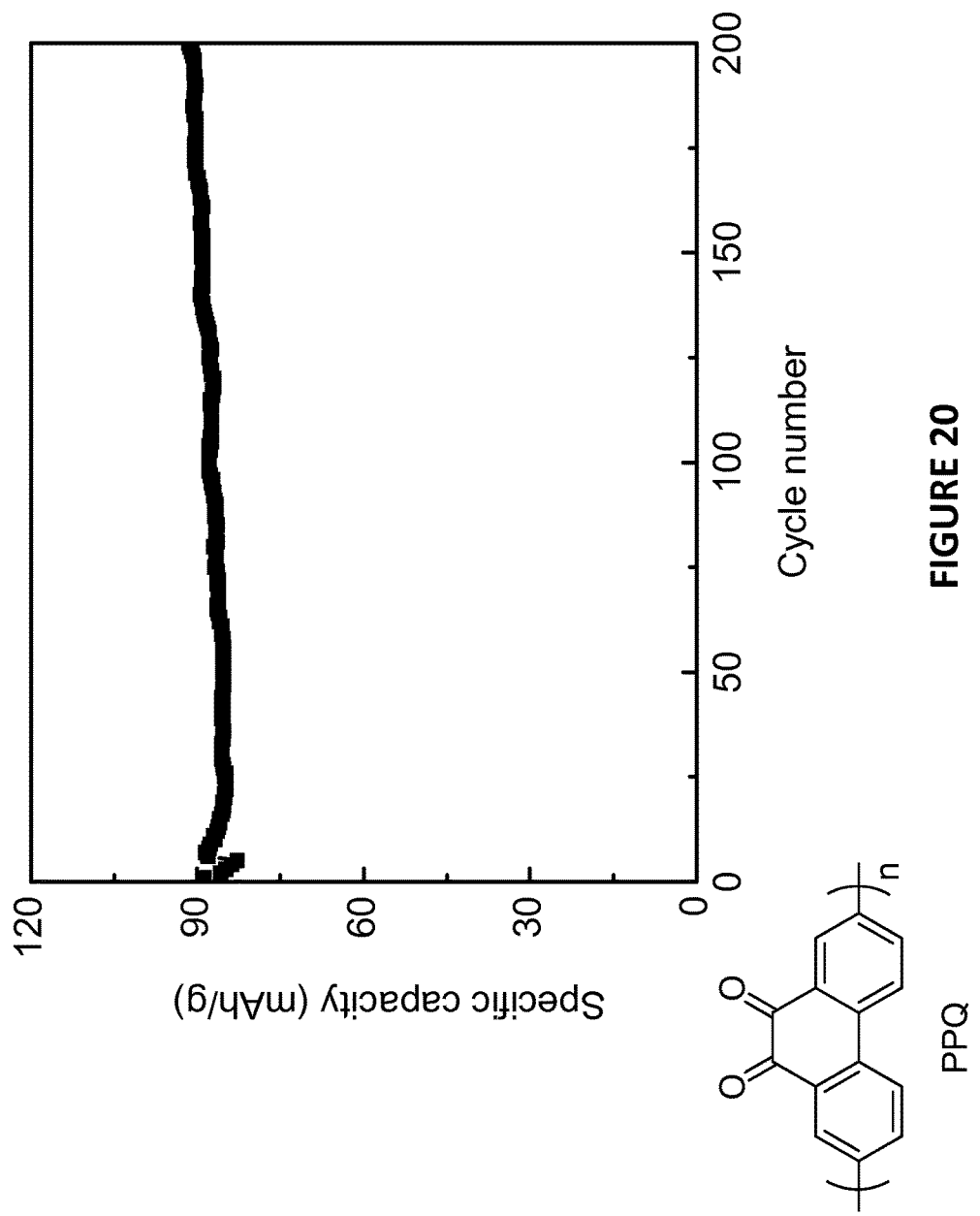
FIG. 20 illustrates the cycling performance of PPQ in a 2.5 M Li$_2$SO$_4$ aqueous solution at pH 13 at a rate for charge and discharge of 1 C.

PPQ was synthesized with a similar method as that for PBDTD. A mixture of PPQ (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) of LiOH (0.1 M) is placed between the working electrode and a piece of activated carbon cloth serving as the counter electrode. Three-electrode coin cells are fabricated to demonstrate an average reduction potential of −0.45 V vs Ag/AgCl (FIG. 19). At 1 C rate (for both charge and discharge), no capacity degradation was observed after 200 cycles (FIG. 20).

Example 7

PPTO (see FIG. 3g)

Figure 21:
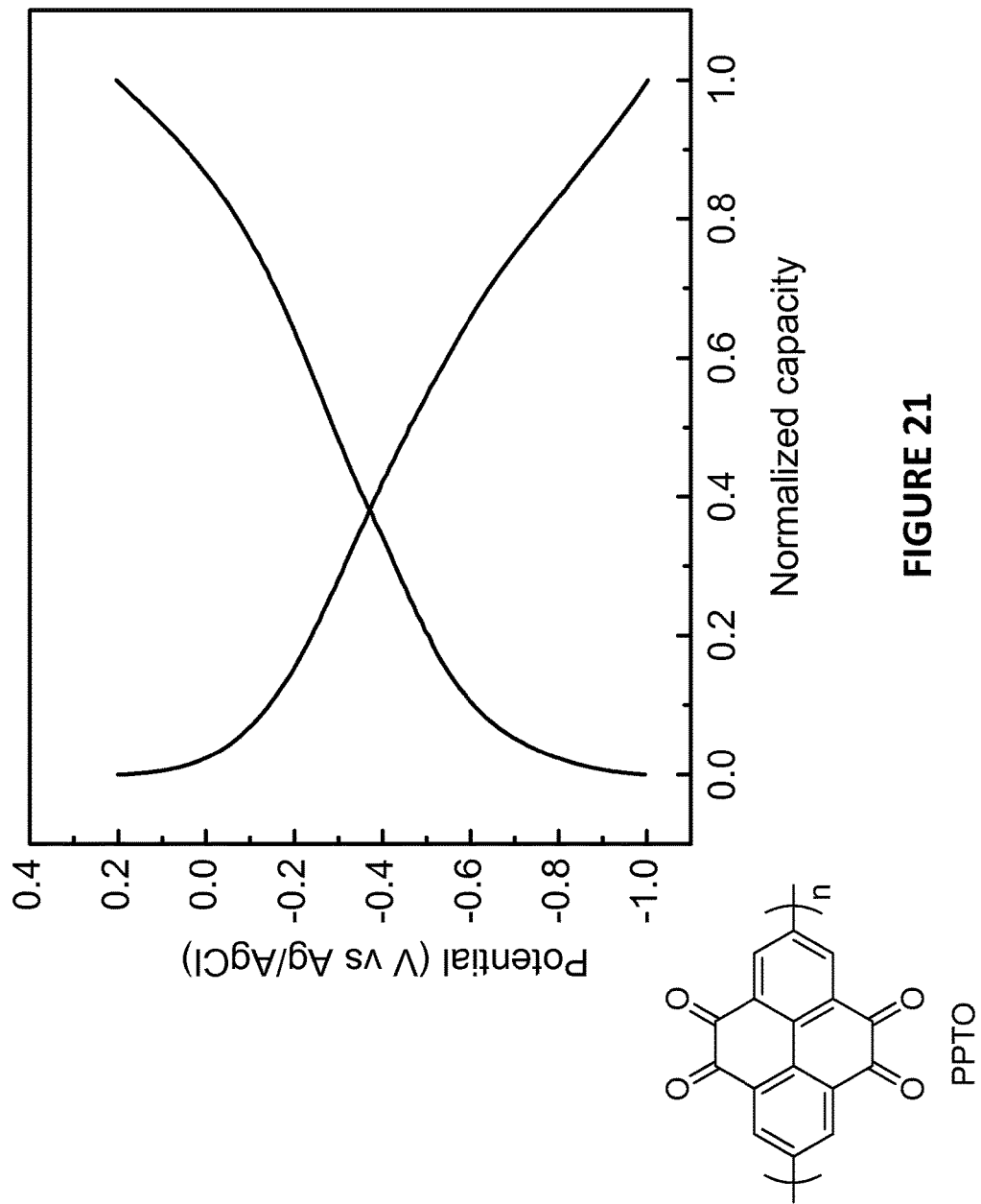
FIG. 21 illustrates the charge-discharge profile of PPTO in a 2.5 M Li$_2$SO$_4$ aqueous solution at pH 7 measured in a three-electrode cell. Rate for charge and discharge: 1 C.

PPTO was synthesized with a similar method as that for PBDTD. A mixture of PPTO (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.46 V vs Ag/AgCl (FIG. 21).

Example 8

PNDI (see FIG. 3h)

Figure 22:
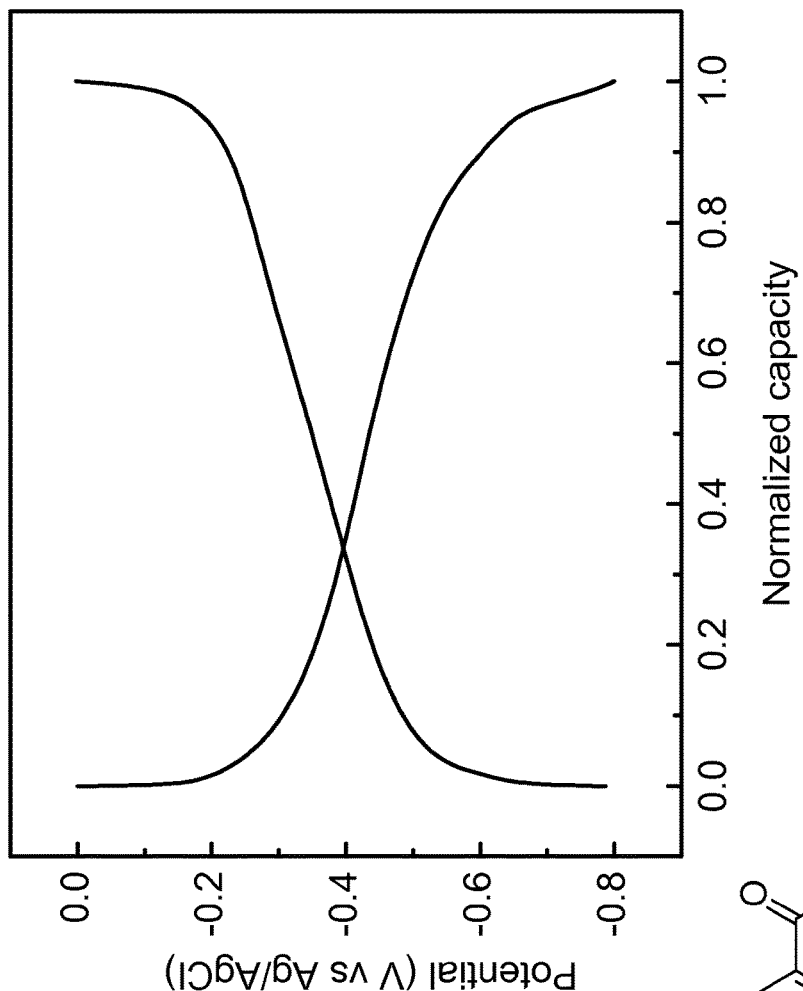
FIG. 22 illustrates the charge-discharge profile of PNDI in a 2.5 M Li$_2$SO$_4$ aqueous solution at pH 7 measured in a three-electrode cell. Rate for charge and discharge: 1 C.
Figure 22:
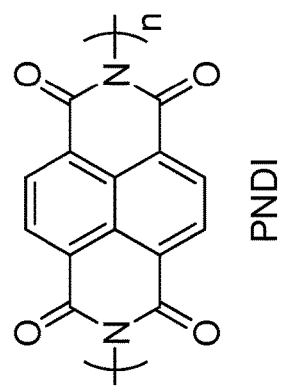

A mixture of PNDI (30 wt. %), Super-P carbon (60 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.44 V vs Ag/AgCl (FIG. 22).

Example 9

PNDIE (see FIG. 3i)

Figure 23:
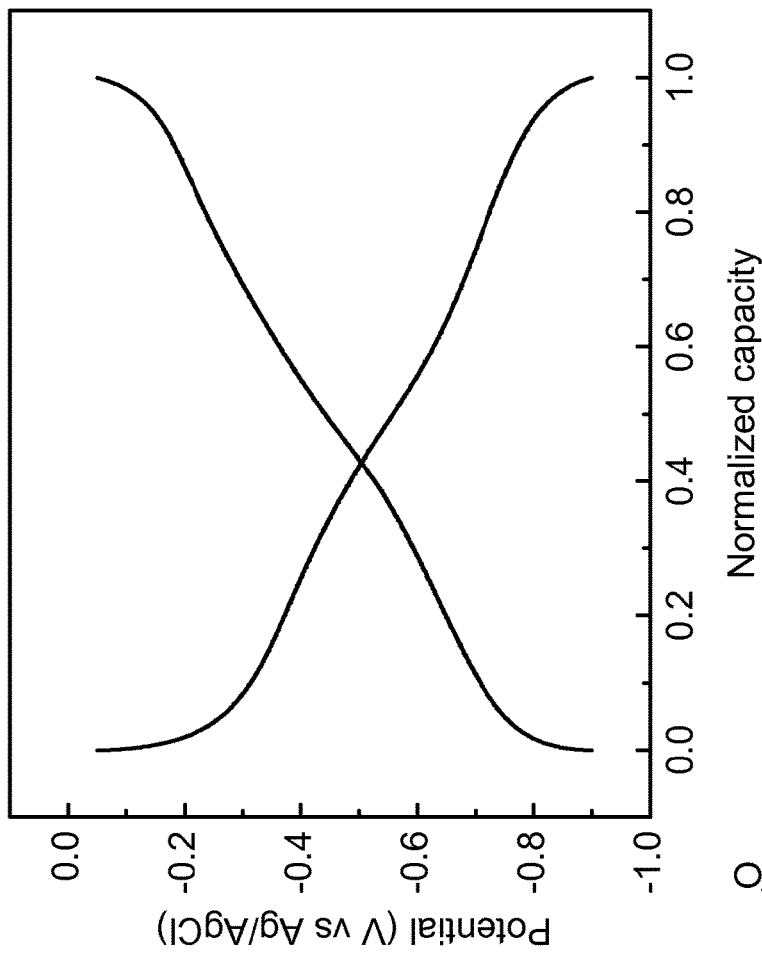
FIG. 23 illustrates the charge-discharge profile of PNDIE in a 2.5 M Li$_2$SO$_4$ aqueous solution at pH 7 measured in a three-electrode cell. Rate for charge and discharge: 1 C.
Figure 24:
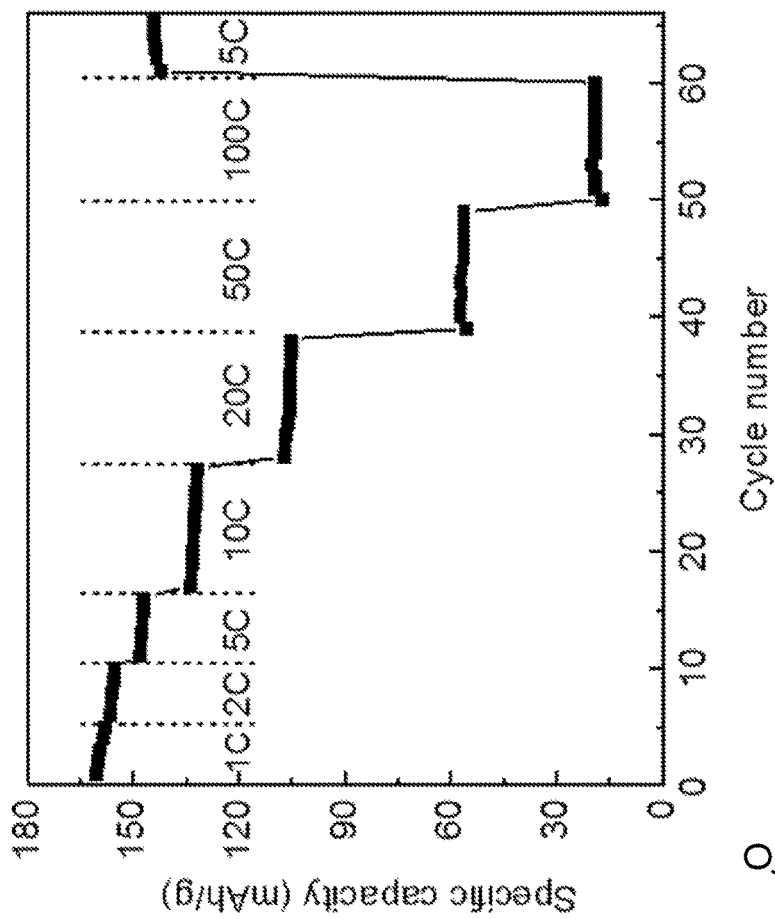
FIG. 24 illustrates the rate capability of PNDIE in a 2.5 M Li$_2$SO$_4$ aqueous solution at pH 7. Same rate for both charge and discharge.
Figure 24:
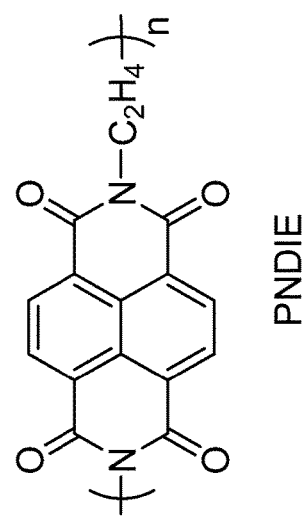
Figure 25:
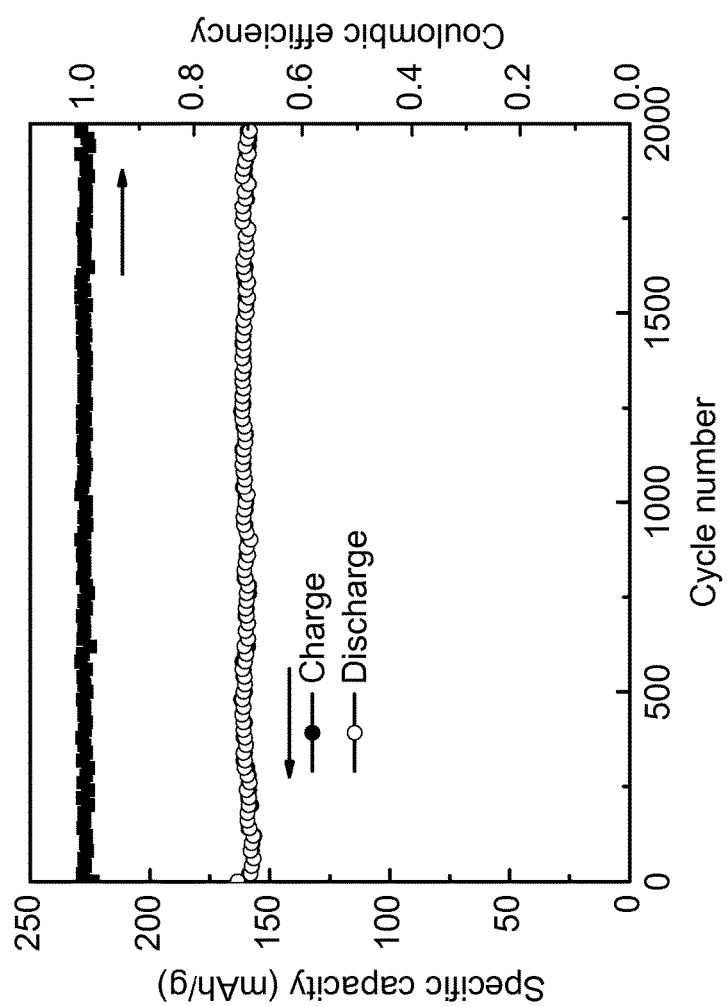
FIG. 25 illustrates the cycling performance of PNDIE in a 2.5 M Li$_2$SO$_4$ aqueous solution at pH 7. Rate for charge and discharge: 10 C.
Figure 25:
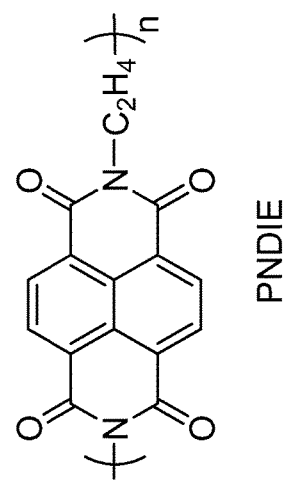
Figure 26:
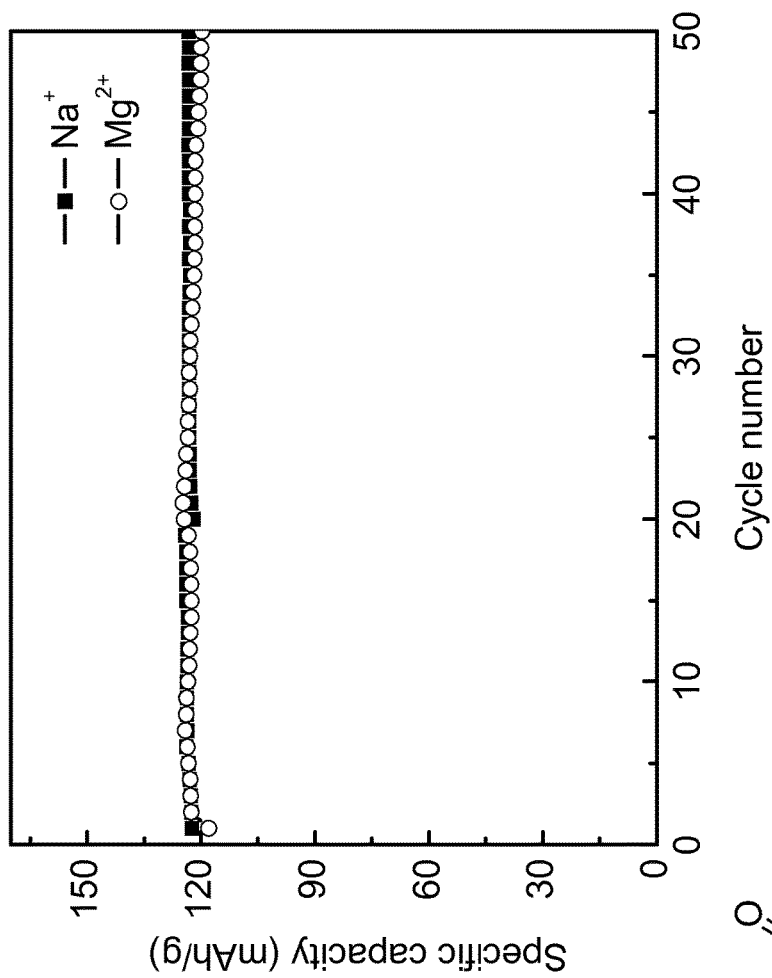
FIG. 26 illustrates the comparison of the capacity and cycling stability of PNDIE in sodium/magnesium salt-based electrolytes ([Na$^+$]=5 M and [Mg$^{2+}$]=2.5M, respectively) at pH 7. Rate for charge and discharge: 1 C.
Figure 26:
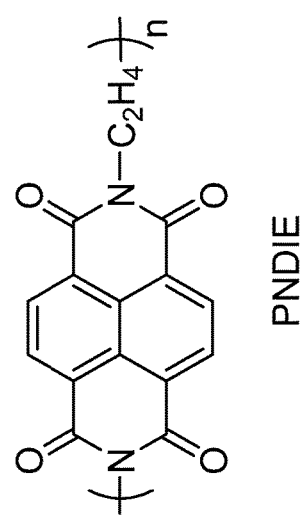

A mixture of PNDIE (60 wt. %), Super-P carbon (30 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.56 V vs Ag/AgCl (FIG. 23). Rate performance tested in two-electrode coin cells showed a 84% capacity retention at 10 C compared to that obtained at 1 C (FIG. 24). At 10 C rate (for both charge and discharge), no noticeable capacity decrease was observed after 2000 cycles (FIG. 25). PNDIE also delivered stable cycling performance when working in sodium (5 M $NaNO_3$)/magnesium (2.5 M $Mg(NO_3)_2$) salt-based electrolytes (FIG. 26).

Example 10

PNDIB (see FIG. 3j)

Figure 27:
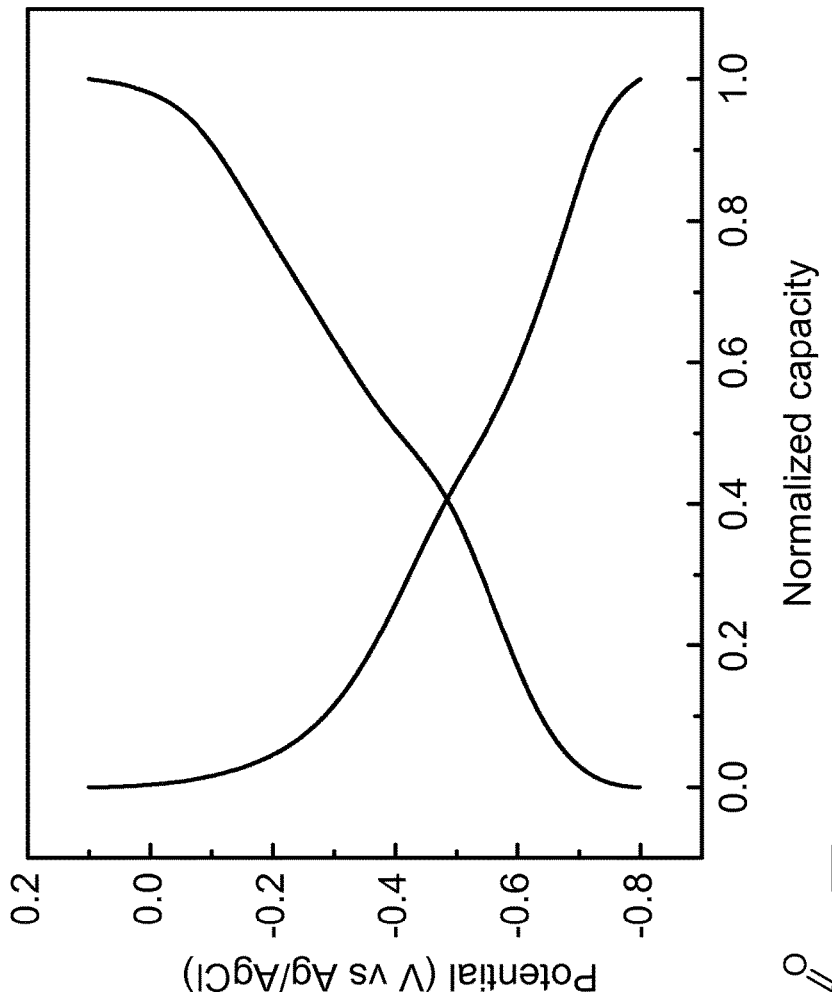
FIG. 27 illustrates the charge-discharge profile of PNDIB in a 2.5 M Li$_2$SO$_4$ aqueous solution at pH 7 measured in a three-electrode cell. Rate for charge and discharge: 1 C.

A mixture of PNDIB (60 wt. %), Super-P carbon (30 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.55 V vs Ag/AgCl (FIG. 27).

Example 11

PPDIE (see FIG. 3k)

Figure 28:
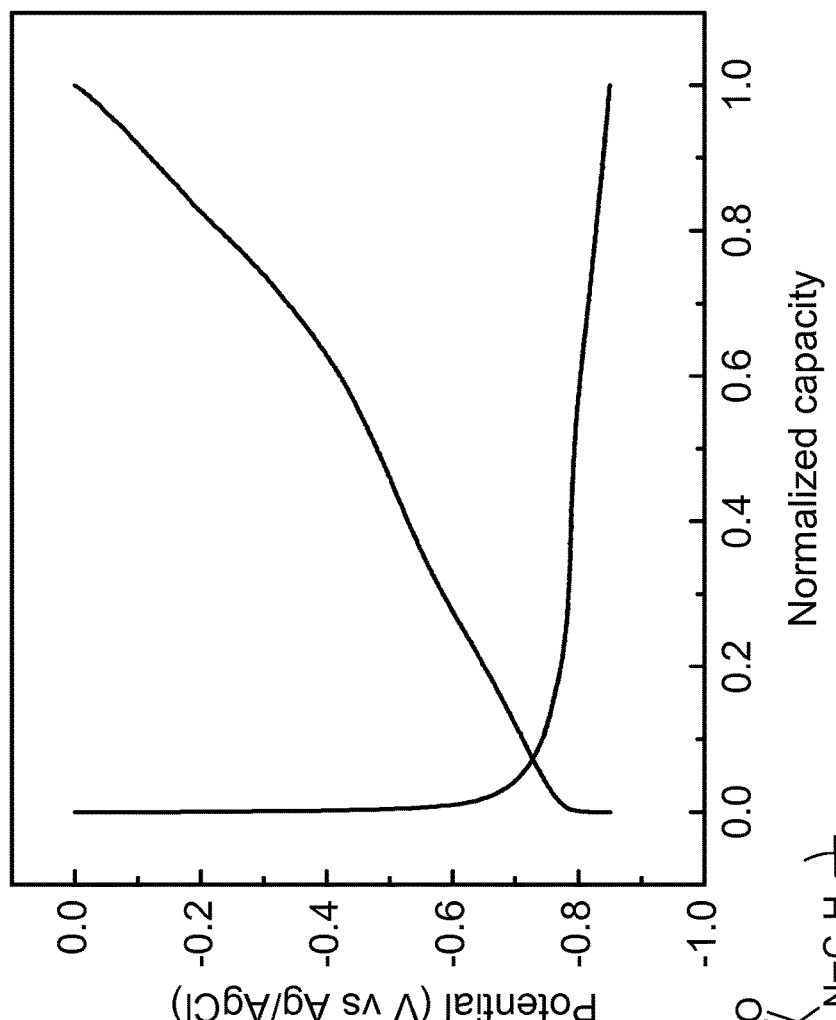
FIG. 28 illustrates the charge-discharge profile of PPDIE in a 2.5 M Li$_2$SO$_4$ aqueous solution at pH 7 measured in a three-electrode cell. Rate for charge and discharge: 1 C.

A mixture of PPDIE (60 wt. %), Super-P carbon (30 wt. %), and polytetrafluoroethylene (10 wt. %) was pressed into a stainless steel mesh to form the working electrode. A glass fiber paper wet with an aqueous solution of $Li_2SO_4$ (2.5 M) is placed between the working electrode and a piece of activated carbon cloth serving as the counter electrode. Three-electrode coin cells are fabricated to demonstrate an average reduction potential of −0.79 V vs Ag/AgCl (FIG. 28).

Variations, combinations, and/or modifications of the embodiment(s) and/or features of the embodiment(s) disclosed herein made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as "comprises", "includes", and "having" means "including but not limited to" and should be understood to also provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated as further disclosure into the specification and the claims are exemplary embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. An aqueous metal-ion battery comprising:
an electrolyte formed of an aqueous solution having a pH ranging from 2 to 12;
an anode comprising at least one organic carbonyl compound as a redox active material for metal-ion (de)intercalation/(un-)coordination;
a cathode comprising a compound for metal-ion (de)intercalation/(un-)coordination; and wherein ionic charge carriers are metal ions that move from the anode to the cathode during discharge and back when charging,
wherein the organic carbonyl compound comprises a structural formula chosen from the group consisting of (I), (II), and (III):

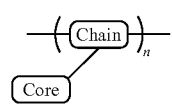

(I)

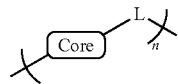

(II)

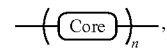

(III)

wherein "Core" has at least one structural formula chosen from the group consisting of (h) and (i):

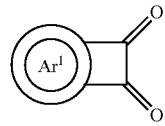

(h)

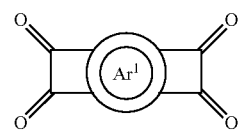

(i)

"Chain" has at least one structural formula chosen from the group consisting of (l), (m), (n) and (o):

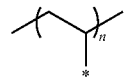

(l)

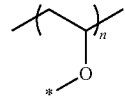

(m)

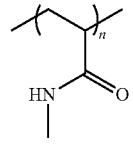

(n)

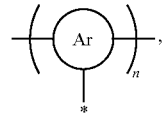

(o)

"L" is a moiety chosen from the group consisting of dicarbonyl, NH, O, S, $CH_2$, $(CH_2)_2$, $(CH_2)_3$, $(CH_2)_4$, $(CH_2)_6$, 5/6 membered aryl/heteroaryl groups, and combinations thereof, "n" is at least 2, $Al^1$ is at least one moiety chosen from the group consisting of naphthalene, perylene, and 5/6 membered aryl/heteroaryl groups.

2. The battery of claim 1, wherein the core is coupled to at least one chemical group chosen from the group consisting of a polymer chain, an oligomer chain, dicarbonyl, NH, O, S, $CH_2$, $(CH_2)_2$, $(CH_2)_3$, $(CH_2)_4$, $(CH_2)_6$, optionally substituted 5-6 membered aryl/heteroaryl groups, and another core.

3. The battery of claim 1, wherein the core comprises at least one chemical group chosen from the group consisting of naphthalene, perylene, optionally substituted 5-6 membered aryl/heteroaryl groups, biaryls having optionally substituted 5-6 membered aryl/heteroaryl groups, H, CH$_3$, and C$_2$H$_5$.

4. The battery of claim 1, wherein the carbonyls in the core are reduced and coordinated to metal-ions.

5. The battery of claim 1, comprising the cathode consisting of at least one organic or inorganic electrode material.

6. The battery of claim 5, wherein the cathode comprises at least one organic electrode material chosen from the group consisting of carbonyl compounds, organosulfur compounds, radical compounds, non-conjugated polymers, and combinations thereof.

7. The battery of claim 1, wherein the cathode is capable of intercalation by/coordination to at least one metal-ion chosen from the group consisting of lithium (Li), sodium (Na), magnesium (Mg), calcium (Ca), and aluminum (Al), and combinations thereof.

8. The battery of claim 1, wherein the aqueous solution comprises at least one metal salt as solute and an aqueous solvent which comprises at least 90 wt. % of water.

9. The battery of claim 1, where the at least one organic carbonyl compound is not p-doped or n-doped and contains electrochemically reducible carbonyl groups.

10. A method of constructing an aqueous battery comprising:
preparing an anode comprising at least one organic carbonyl compound as a redox active material for metal-ion (de)intercalation/(un-)coordination;
preparing a cathode comprising a compound for metal-ion (de)intercalation/(un-) coordination; and
contacting the anode and the cathode with an electrolyte formed of an aqueous solution having a pH ranging from 2 to 12;
wherein ionic charge carriers are metal ions that move from the anode to the cathode during discharge and back when charging,
wherein the organic carbonyl compound comprises a structural formula chosen from the group consisting of (I), (II), and (III):

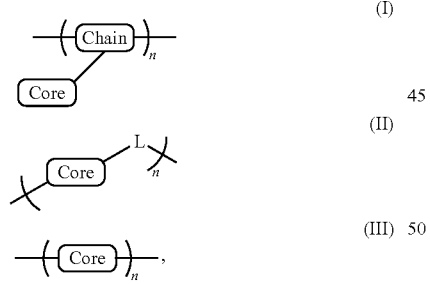

wherein "Core" has at least one structural formula chosen from the group consisting of (h) and (i):

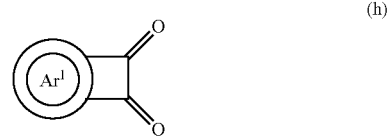

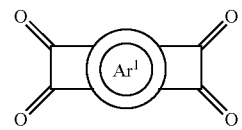

"Chain" has at least one structural formula chosen from the group consisting of (l), (m), (n) and (o):

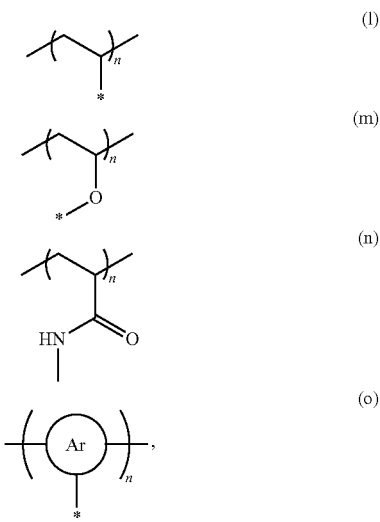

"L" is a moiety chosen from the group consisting of dicarbonyl, NH, O, S, CH$_2$, (CH$_2$)$_2$, (CH$_2$)$_3$, (CH$_2$)$_4$, (CH$_2$)$_6$, 5/6 membered aryl/heteroaryl groups, and combinations thereof, "n" is at least 2, Al$^1$ is at least one moiety chosen from the group consisting of naphthalene, perylene, and 5/6 membered aryl/heteroaryl groups.

11. The method of claim 10, wherein the cathode comprises an inorganic or organic compound capable of intercalation by/coordination to at least one metal-ion chosen from the group consisting of lithium (Li), sodium (Na), magnesium (Mg), calcium (Ca), and aluminum (Al), and combinations thereof.

12. The method of claim 10, wherein the aqueous solution comprises at least one metal salt as solute and an aqueous solvent which comprises at least 90 wt. % of water.

13. The method of claim 10, where the at least one organic carbonyl compound is not p-doped or n-doped and contains electrochemically reducible carbonyl groups.

14. The method of claim 10, wherein the core is coupled to at least one chemical group chosen from the group consisting of a polymer chain, an oligomer chain, dicarbonyl, NH, O, S, CH$_2$, (CH$_2$)$_2$, (CH$_2$)$_3$, (CH$_2$)$_4$, (CH$_2$)$_6$, optionally substituted 5-6 membered aryl/heteroaryl groups, and another core.

* * * * *